United States Patent
Gantke et al.

(10) Patent No.: US 9,573,286 B2
(45) Date of Patent: Feb. 21, 2017

(54) DUST COLLECTION SYSTEM FOR A CIRCULAR SAW

(71) Applicants: Robert Bosch Tool Corporation, Broadview, IL (US); Robert Bosch GmbH, Stuttgart (DE)

(72) Inventors: Reinhard Gantke, Großbettlingen (DE); Hans-Joerg Hopfengart, Aichwald (DE); Uwe Striggow, Aichtal-Grötzingen (DE); Ralph Dammertz, Palatine, IL (US); Juergen Wiker, Schaumburg, IL (US)

(73) Assignees: Robert Bosch Tool Corporation, Broadview, IL (US); Robert Bosch GmbH, Stuttgart (DE)

( * ) Notice: Subject to any disclaimer, the term of this patent is extended or adjusted under 35 U.S.C. 154(b) by 300 days.

(21) Appl. No.: 14/207,811

(22) Filed: Mar. 13, 2014

(65) Prior Publication Data

US 2014/0260848 A1 Sep. 18, 2014

Related U.S. Application Data

(60) Provisional application No. 61/787,323, filed on Mar. 15, 2013.

(51) Int. Cl.
*B26D 7/18* (2006.01)
*B23D 59/00* (2006.01)
*B23D 45/04* (2006.01)

(52) U.S. Cl.
CPC .......... *B26D 7/1863* (2013.01); *B23D 45/048* (2013.01); *B23D 59/006* (2013.01); *Y10T 83/0453* (2015.04); *Y10T 83/207* (2015.04)

(58) Field of Classification Search
CPC .......... B26D 7/1863; B26D 1/04; B26D 1/06; B26D 1/14; B26D 1/143; B26D 1/18; B26D 3/02; B23D 59/006; B23D 45/048; B23D 45/02; B23D 45/04; B23D 45/024; B23D 45/14; B23D 45/16; Y10T 83/0453; Y10T 83/207; Y10T 83/0443; Y10T 83/7693; Y10T 83/7697; Y10T 83/7701; Y10T 83/7705; Y10T 83/7726; Y10T 83/7763
See application file for complete search history.

(56) References Cited

U.S. PATENT DOCUMENTS 4,253,362 A 3/1981 Olson
5,167,215 A * 12/1992 Harding, Jr. ......... B23D 59/006
                                                    125/13.01

(Continued)

OTHER PUBLICATIONS

International Search Report and Written Opinion corresponding to PCT Application No. PCT/US2014/026517, mailed Jun. 20, 2014 (9 pages).

*Primary Examiner* — Phong Nguyen
(74) *Attorney, Agent, or Firm* — Maginot Moore & Beck LLP

(57) ABSTRACT

A dust collection system for a circular saw having a saw housing and a motor configured to rotationally drive a saw blade includes a dust collecting member and a guide mechanism. The dust collecting member includes a body having a first end in which a dust collection opening is defined and a second end operably connectable to an airflow generation device. The guide mechanism is configured to support the dust collecting member on the saw housing such that the dust collection opening remains adjacent to an outer edge of the saw blade in response to one of the dust collecting member and the guide mechanism contacting the workpiece to move the dust collecting member.

16 Claims, 26 Drawing Sheets

(56) References Cited

U.S. PATENT DOCUMENTS

| | | | |
|---|---|---|---|
| 5,782,153 A * | 7/1998 | Sasaki | B23D 59/006 83/162 |
| 6,470,778 B1 | 10/2002 | Kaye, Jr. et al. | |
| 6,796,208 B1 | 9/2004 | Jorgensen | |
| 8,061,344 B2 * | 11/2011 | Dofher | B28D 7/02 125/13.01 |
| 2002/0189415 A1 | 12/2002 | Oktavec et al. | |
| 2005/0160892 A1 * | 7/2005 | Bergmann | B23D 59/006 83/100 |
| 2006/0053629 A1 * | 3/2006 | Martin | B23D 59/006 30/123 |
| 2008/0163492 A1 * | 7/2008 | Johansson | B23D 59/006 30/124 |
| 2011/0011229 A1 | 1/2011 | Lawlor et al. | |

\* cited by examiner

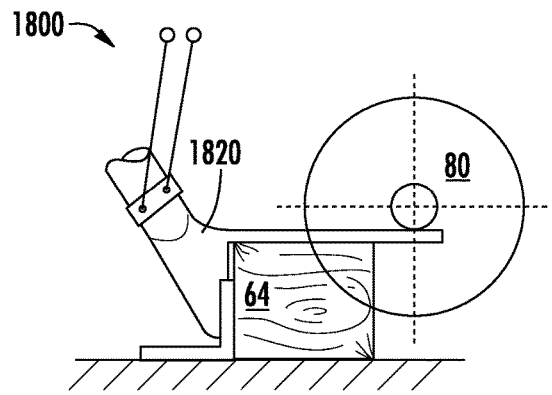
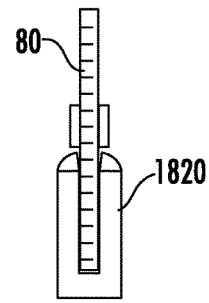
FIG. 25A    FIG. 25B
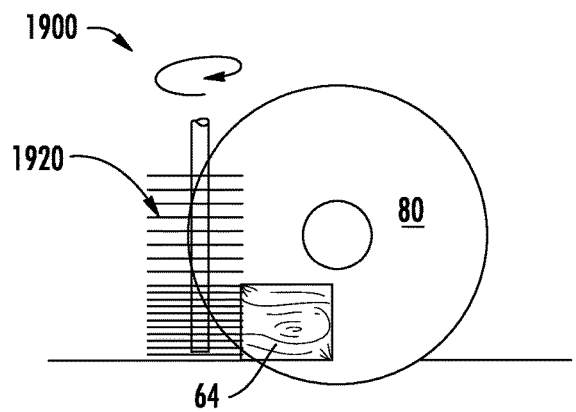
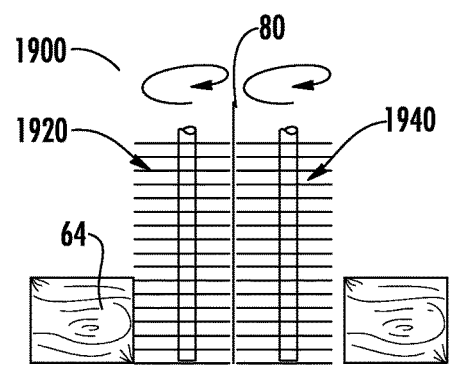
FIG. 26A    FIG. 26B
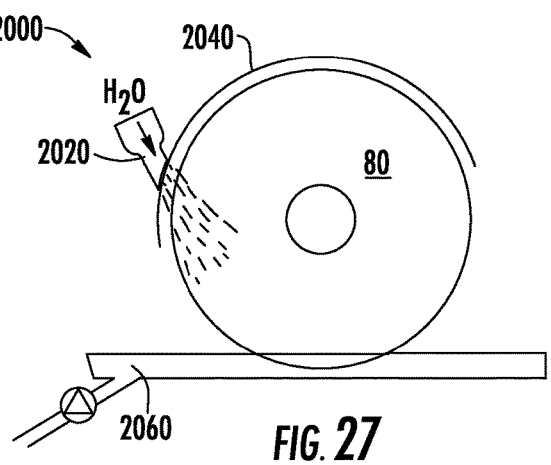
FIG. 27

DUST COLLECTION SYSTEM FOR A CIRCULAR SAW

CLAIM OF PRIORITY

This application claims priority to U.S. Provisional Application Ser. No. 61/787,323 entitled "Dust Collection System for a Circular Saw" by Gantke et al., filed Mar. 15, 2013, the disclosure of which is hereby incorporated herein by reference in its entirety.

TECHNICAL FIELD

This disclosure relates generally to power tools, and, more particularly, to dust collection for power tools.

BACKGROUND

Circular saws are a type of power tool used for cutting and shaping a workpiece, such as, hardwood, manufactured wood products, construction lumber, and other materials. The typical circular saw includes a circular blade, which generates dust and debris as the rotating blade is moved through the workpiece during a cut. Generally, the dust and debris interferes with the cutting task by obstructing the user's view of the workpiece and diffusing into the surrounding air space. Additionally, the dust and debris contaminates the area near where the cutting operation is performed, necessitating extensive clean up and potentially causing issues with other equipment nearby. Accordingly, it is desirable to collect the dust generated by the circular saw with a dust collection system.

Dust collection systems for use with a circular saw include a source of vacuum that is fluidly connected to the circular saw with a vacuum line. In particular, known circular saws include a dust channel having an input port and an output port. The input port is positioned to receive the dust and debris as it is generated by the saw blade. The output port is fluidly connected to the vacuum line. When the source of vacuum is activated, the dust and debris generated by the circular saw blade cutting the workpiece is drawn into the input port, through the dust channel, out the output port, and through the vacuum line where it is collected in a bin for disposal or repurposing.

Typically, dust channels are positioned behind the saw blade in the blade guard. The dust channel is not movable, and remains in the same position regardless of the position of the workpiece. Additionally, conventional dust channels cannot compensate for workpieces of differing sizes and shapes. Consequently, the dust channel may be a substantial distance from the saw blade and workpiece as the saw blade cuts the workpiece. The dust and debris generated by the cutting task scatters widely over small distances and, therefore, the fixed dust channel is only able to collect a portion of the dust and debris. It would thus be desirable to provide an improved dust collection system to collect a larger portion of the dust and debris generated during a cutting task.

SUMMARY

In one embodiment a dust collection system for a circular saw having a saw housing and a motor configured to rotationally drive a saw blade comprises a dust collecting member and a guide mechanism. The dust collecting member includes a body having a first end in which a dust collection opening is defined and a second end operably connectable to an airflow generation device. The guide mechanism is configured to support the dust collecting member on the saw housing such that the dust collection opening remains adjacent to an outer edge of the saw blade in response to one of the dust collecting member and the guide mechanism contacting the workpiece to move the dust collecting member.

In another embodiment, a method of operating a dust collection system for a circular saw comprises moving a saw blade of a circular saw such that a dust collecting system of the circular saw engages a workpiece, guiding a dust collecting member of the dust collecting system such that as the dust collecting system engages the workpiece during a cutting operation a dust collecting opening of the dust collecting member remains proximate to an intersection of the saw blade and the workpiece, and generating an airflow through the dust collecting opening with an airflow generating device to move dust produced during the cutting operation.

In yet another embodiment, a circular saw comprises a saw housing, a saw blade rotatably coupled to the saw housing, a motor supported in the saw housing and configured to rotationally drive the saw blade, an airflow generation device supported by the saw housing, and a dust collecting member including a body having a first end in which a dust collection opening is defined and a second end operably connected to the airflow generation device. The circular saw further comprises a guide mechanism configured to support the dust collecting member on the saw housing such that the dust collection opening remains adjacent to an outer edge of the saw blade in response to one of the dust collecting member and the guide mechanism contacting the workpiece to move the dust collecting member.

BRIEF DESCRIPTION OF THE DRAWINGS

FIG. 25A is a side schematic view of a dust control system for a circular saw.

FIG. 25B is a front schematic view of the dust control system of FIG. 25A.

FIG. 26A is a side schematic view of a dust control system for a circular saw.

FIG. 26B is a rear schematic view of the dust control system of FIG. 26A.

FIG. 27 is a side schematic view of a dust control system for a circular saw.

DETAILED DESCRIPTION

For the purposes of promoting an understanding of the principles of the embodiments described herein, reference is now made to the drawings and descriptions in the following written specification. No limitation to the scope of the subject matter is intended by the references. This disclosure also includes any alterations and modifications to the illustrated embodiments and includes further applications of the principles of the described embodiments as would normally occur to one skilled in the art to which this document pertains.

Figures 1, 2:
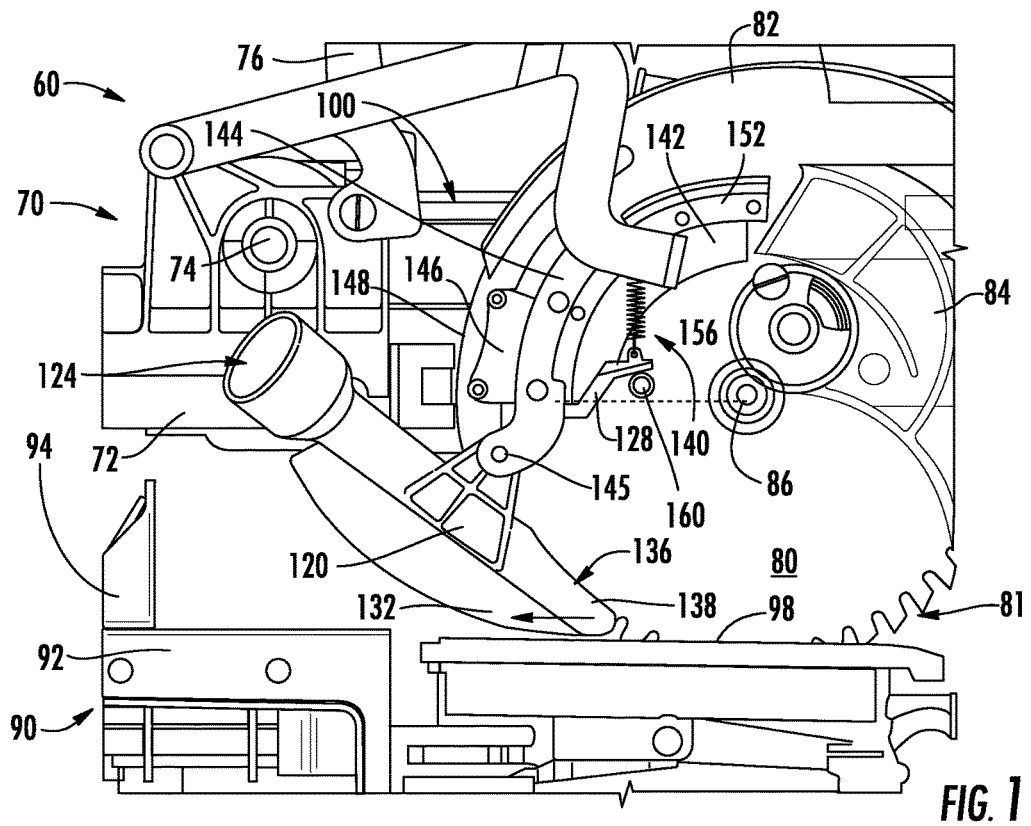
FIG. 1 is a side view of a miter saw having a dust collection system with a pivoting dust chute.
FIG. 2 is a side perspective view of the miter saw and dust collection system of FIG. 1.
Figure 3:
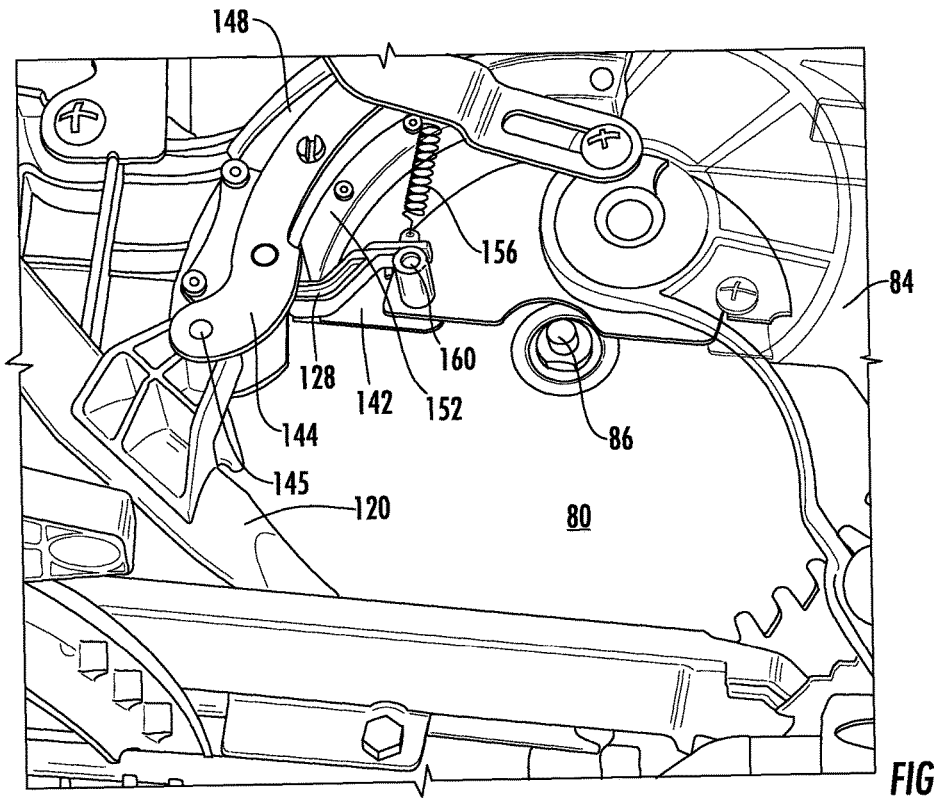
FIG. 3 is a bottom perspective view of the miter saw and dust collection system of FIG. 1.

FIGS. 1-3 depict a miter saw 60 having a dust collection system 100. The miter saw 60 includes a saw frame 70, a saw blade 80, and a saw support 90. The frame 70 includes a saw slide 72, a saw pivot 74, and a handle 76. The saw slide 72 and saw pivot 74 are operatively connected to the handle 76 such that movement of the handle 76 pivots the frame 70 about the saw pivot 74 and moves the frame along the saw slide 72. The frame 70 is operatively connected to the saw blade 80 to enable movement of the frame 70 to move the saw blade 80. Pivoting the saw frame 70 about the saw pivot 74 raises and lowers the saw blade 80, while sliding the frame 70 along the saw slide 72 moves the saw blade 80 forward and backward.

The saw blade 80 includes a fixed guard 82, a pivoting front guard 84, and a saw drive axle 86. The fixed guard 82 is fixedly attached to the saw frame 70 and covers an upper portion of the saw blade 80 to protect the user from being injured by the rotating saw blade 80 and to prevent foreign objects from interfering with the saw blade 80. The pivoting front guard 84 is pivotably connected to the frame 70 and the blade 80 to pivot as the saw blade 80 is raised and lowered, enclosing a front portion of the saw blade 80 when the saw blade 80 is in the lowered working position. The saw drive axle 86 passes through a central opening in the saw blade 80 and connects the saw blade 80 to a motor (not shown) housed within the frame 70 such that actuation of the motor turns the saw blade 80.

The saw support 90 is connected to the frame 70 to support the frame 70 and saw blade 80. The saw support 90 has a workpiece platform 92, a workpiece support 94, a cutting track 96 (FIG. 2), and a base 98. The workpiece platform 92 is configured for a workpiece 64 (FIG. 4A) to rest on, while the workpiece support 94 retains the workpiece 64 in a fixed horizontal position as the saw blade 80 cuts the workpiece 64. The cutting track 96 extends under the workpiece platform 92 and is configured to accommodate the saw blade 80 to enable the saw blade 80 to extend beneath the workpiece 64 to cut the entire thickness of the workpiece 64.

The dust collection system 100 includes a dust chute 120 and a cam system 140. The dust chute 120 has a vacuum connector 124, a pivot projection 128, a curved edge 132, a dust collection opening 136, and a rounded front end 138. The vacuum connector 124 is configured to accommodate a hose for a vacuum to enable the vacuum to generate a negative pressure within the dust chute 120. While the system is described herein with reference to pulling dust and debris into the dust collecting member, the reader should appreciate that the system disclosed herein is also suitable to expel air from the dust collecting member to disperse dust and debris generated during a cutting operation by connecting the dust collecting member to a positive pressure source. Reference herein to "dust collecting" and "dust collection" is intended to refer to either pulling dust into the system or dispersing dust by expelling dust from the system.

The pivot projection 128 extends from a middle region of the dust chute 120 to interface with the cam system 140. The curved edge 132 extends from a side of the dust chute 120 toward the saw base 90 to interface with the workpiece 64. The dust collection opening 136 is an arcuate opening that is wider than the width of the saw blade 80 and has a radius that is similar to an outer radius of the saw blade 80 to enable the dust collection opening 136 to accommodate a portion of the outer edge 81 of the saw blade 80.

The cam system 140 includes a fixed plate 142, a sliding member 144, a movable guard 148, a cam track 152, a spring 156, and a stop pin 160. The sliding member 144 includes a pivot pin 145 that pivotably connects the dust chute 120 to the sliding member 144 and a flange 146 extending toward the rear of the miter saw 60 to fixedly connect the sliding member 144 to the movable guard 148. The sliding member 144 is configured to engage the cam track 152 such that the sliding member 144 and movable guard 148 slide along the cam track 152. The cam track 152 is fixed to the saw frame 70 by the fixed plate 142 and has an arc shape that is centered about the saw drive axle 86 at the center of the saw blade 80 to define a virtual pivot point about the saw drive axle 86. The spring 156 is connected at one end to the pivot projection 124 of the dust chute 120 and at the other end to the upper end of the sliding member 144. The stop pin 160 is fixedly connected to the frame 70 of the saw 60 via the fixed plate 142, and is configured to prevent movement of the pivot projection 128 below the stop pin 160.

Figure 4A:
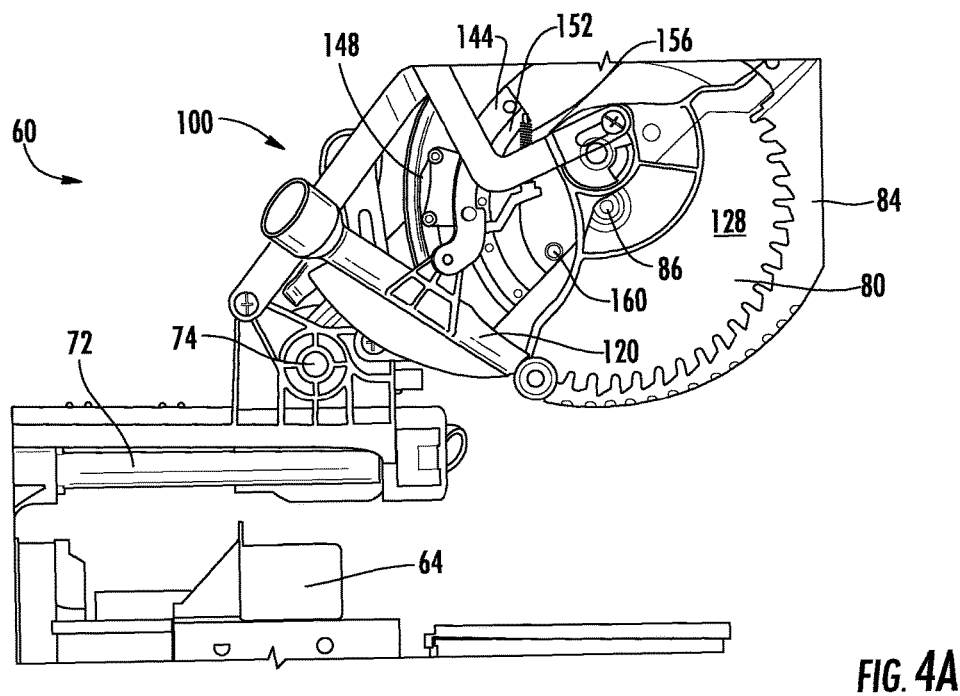
FIG. 4A is a side view of the miter saw and dust collection system of FIG. 1 in a raised position.
Figure 4B:
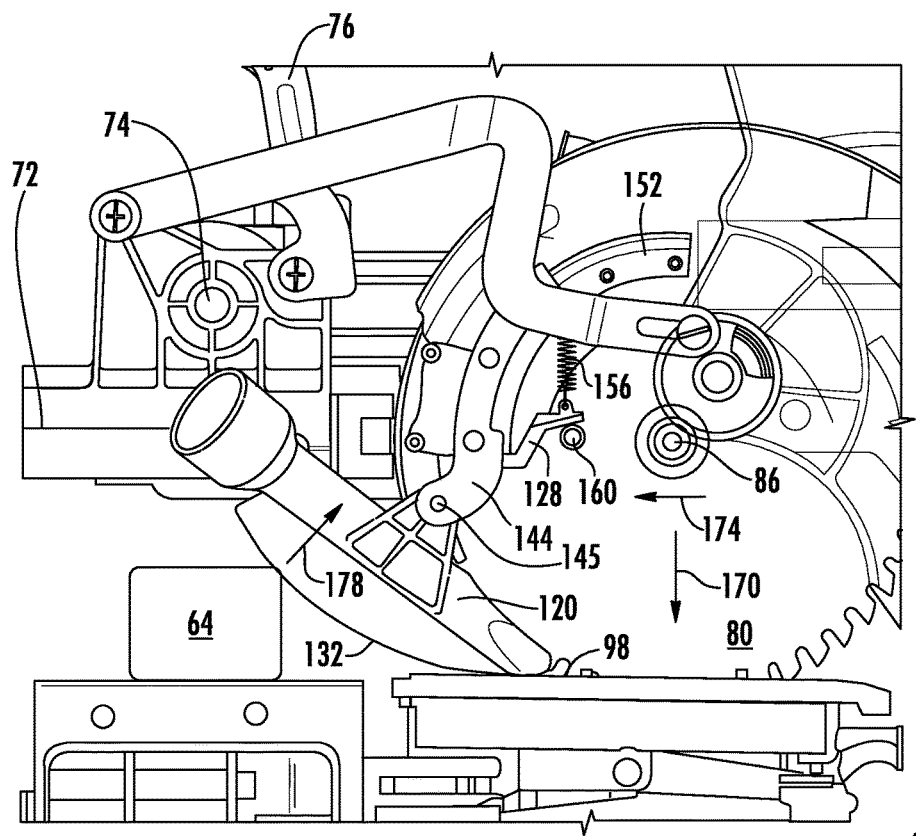
FIG. 4B is a side view of the miter saw and dust collection system of FIG. 1 with a dust chute beginning to contact a workpiece.
Figure 4C:
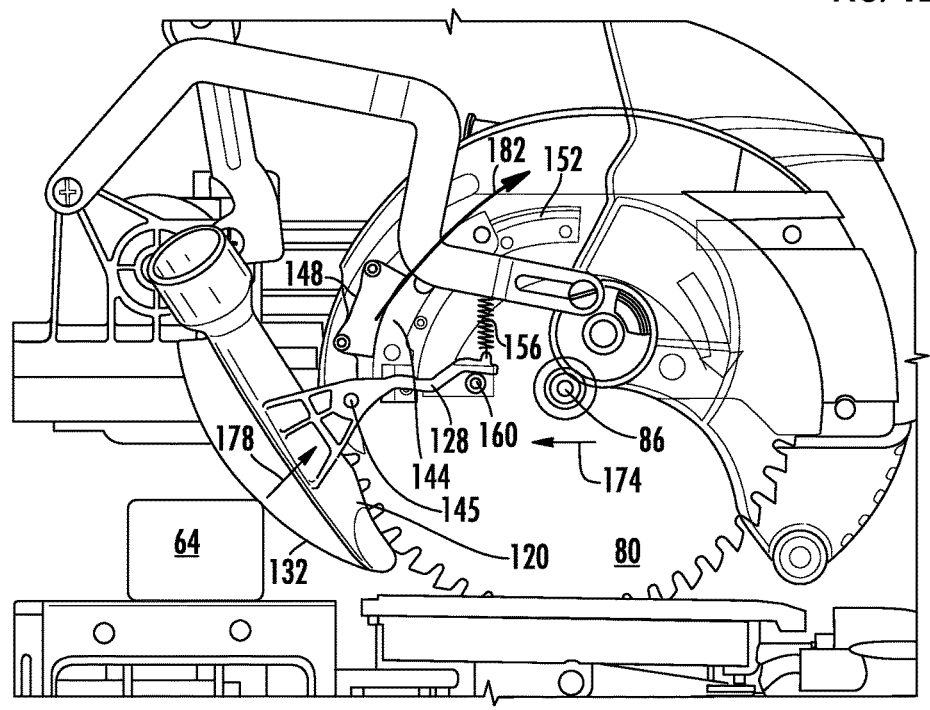
FIG. 4C is a side view of the miter saw and dust collection system of FIG. 1 with the dust chute pivoting further about the virtual pivot point.
Figure 4D:
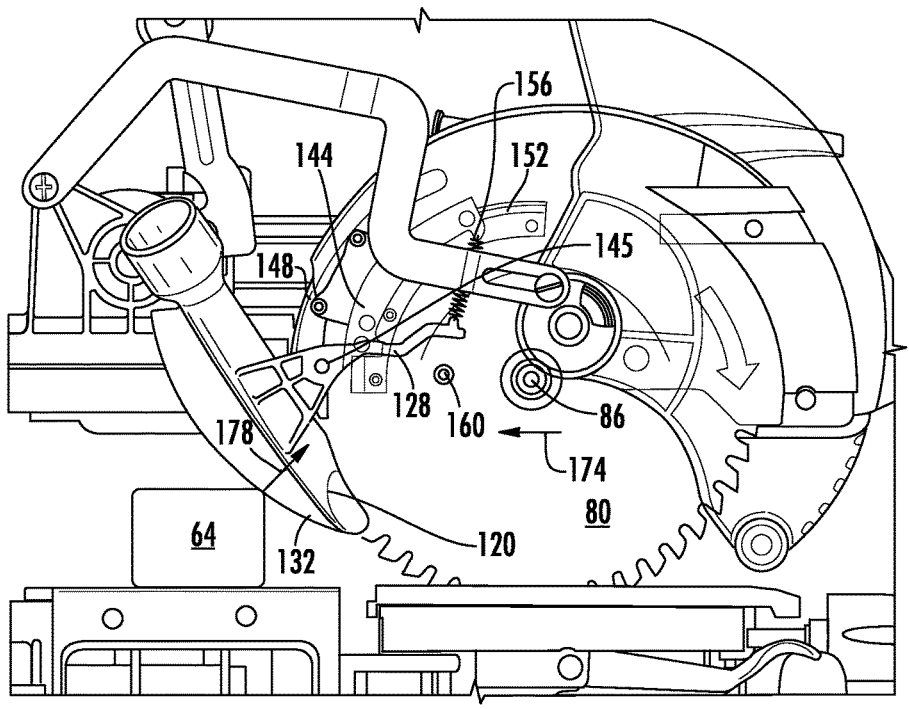
FIG. 4D is a side view of the miter saw and dust collection system of FIG. 1 with the dust chute pivoting about a pivot pin and the virtual pivot point.
Figure 4E:
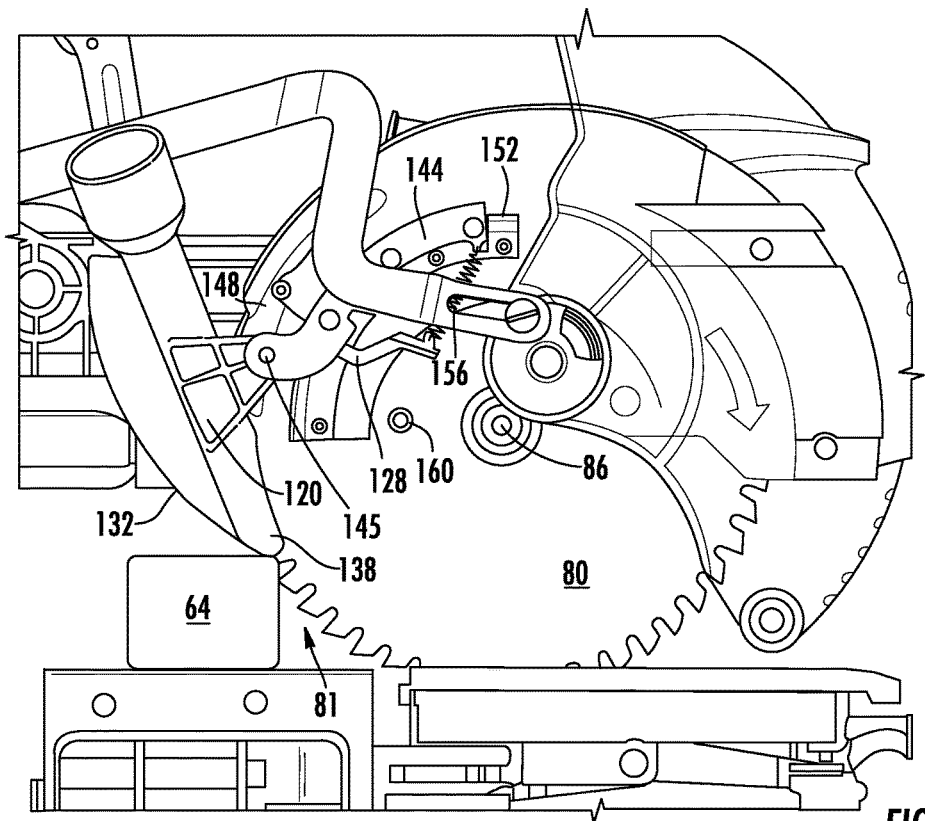
FIG. 4E is a side view of the miter saw and dust collection system of FIG. 1 with the dust chute pivoted to contact the top of the workpiece.
Figure 4F:
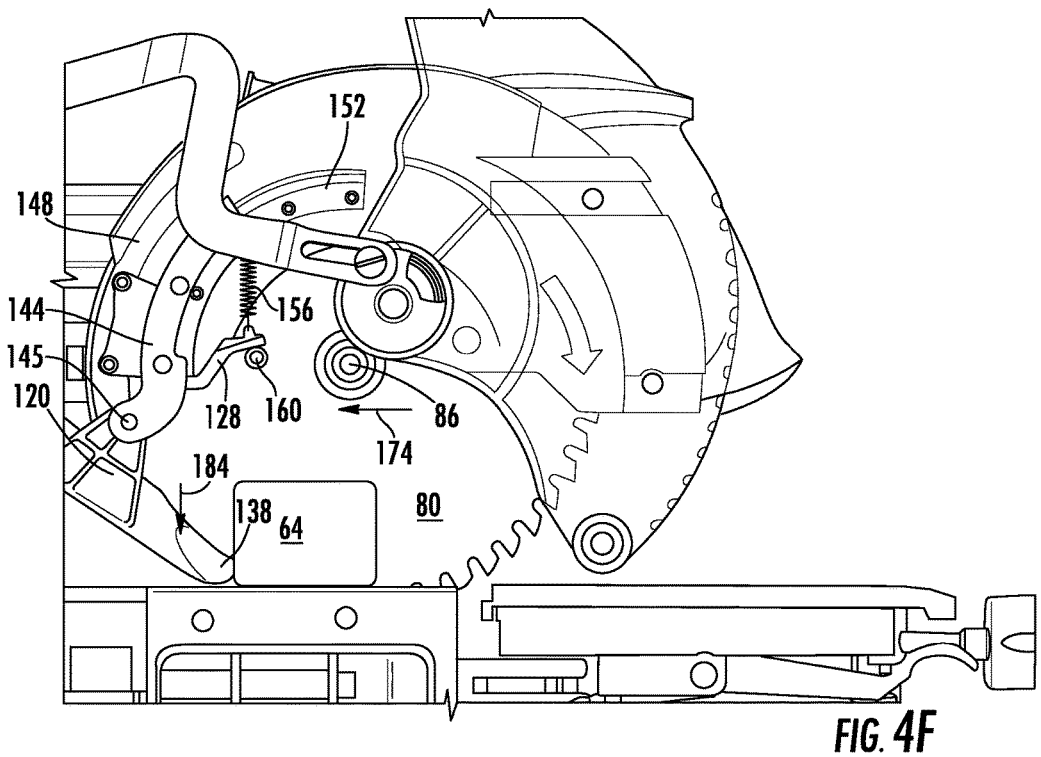
FIG. 4F is a side view of the miter saw and dust collection system of FIG. 1 with the dust chute reaching the bottom of the workpiece.

In operation, the dust collection system 100 progressively moves from the position of FIG. 4A to the position shown in FIG. 4F as the miter saw 60 is used to cut the workpiece 64. FIG. 4A depicts the miter saw 60 with the blade 80 in a raised position. The sliding member 144 is positioned at the upper end of the cam track 152. The dust chute 124 is also in a raised position by virtue of the pivot pin 145 connecting the dust chute 120 to the lower end of the sliding member 144 and the spring 156 connecting the upper end of the sliding member 144 to the pivot projection 128. The blade guard 84 of the saw blade 80 partially encompasses the rounded end 138 of the dust chute 120 to cover the saw blade 80 and prevent contact with the blade 80. A workpiece 64 is positioned on the workpiece platform 92, abutting the workpiece support 94 to hold the workpiece 64 securely in place during the cutting operation.

The user then uses the handle 76 of the miter saw 60 to pivot the saw blade 80 about the saw pivot 74, moving the saw blade downwardly, in direction 170. As the saw blade 80 pivots downwardly, the front blade guard 84 opens to expose the lower portion of the saw blade 80. Additionally, the sliding member 144 slides to the bottom of the cam track 152 under gravity, moving the dust chute 120 about the virtual pivot point at the saw drive axle 86 to the lowered position shown in FIG. 4B. In the lowered position, the pivot projection 128 engages the stop pin 160 to pivot the dust chute 120 about the pivot pin 145 such that the curved edge 132 rests against the saw base 98.

The user then pulls the handle 76 to move the miter saw 60 in direction 174, toward the workpiece 64. As the miter saw 60 moves in direction 174, the curved edge 132 engages a corner of the workpiece 64, as shown in FIG. 4B. In response, the workpiece 64 exerts a reaction force on the dust chute 120 in direction 178. Further movement of the saw 60 in direction 174 raises the dust chute off 120 the base 98 as shown in FIG. 4C. Since the pivot projection 128 remains in contact with the stop pin 160, the reaction force from the workpiece 64 is converted into a pivoting motion of the dust chute 120, sliding member 144, and movable guard 148 about the virtual pivot point at the saw drive axle 86 as the sliding member 144 slides along the cam track 152 in direction 182. As the sliding member 144 continues to slide along the cam track 152, the spring attached at the upper end of the cam track 152 pulls the end of the pivot projection 128 off the stop pin 160, as shown in FIG. 4D, pivoting the dust chute 120 about the pivot pin 145. The dust chute 120 pivots until the curved edge 132 pulls off the workpiece 64 and the rounded end 138 engages the top of the work piece 64 as the saw blade 80 begins to contact the workpiece 64, as shown in FIG. 4E. The dust collecting opening 136 remains at a position partially surrounding the outer edge 81 of the blade 80 adjacent the workpiece 64 to enable the negative pressure generated in the dust collecting opening 136 by the attached vacuum to draw the debris and dust produced during the cutting of the workpiece 64 into the dust chute 120.

The dust chute 120 continues to slide along the top of the workpiece 64 as the saw is moved in direction 174 and the saw blade 80 cuts through the workpiece 64. As the dust chute 120 reaches the top rear corner of the workpiece 64, the dust chute 120 begins sliding down the rear surface of the workpiece 64 under the force of gravity as the blade 80 continues to cut the workpiece 64. The sliding member 144 pivots about the virtual pivot point 86 as the dust chute 120 simultaneously pivots about the pivot pin 145 to retain the dust chute 120 in contact with the rear surface of the workpiece. The constant contact of the dust chute 120 with the workpiece 64 prevents a gap from forming between the workpiece 64 and the dust chute 120, enabling the dust chute 120 and the dust collecting opening 136 to remain adjacent to the intersection point of the outer edge 81 of the saw blade 80 and the workpiece 64 to collect the dust and debris produced during the cutting operation. The dust chute 120 moves downwardly in direction 184 to the position of FIG. 4F as the saw blade 80 finishes cutting the workpiece 64, remaining in contact with the rear surface of the workpiece 64 until the cutting operation is complete.

Figure 5A:
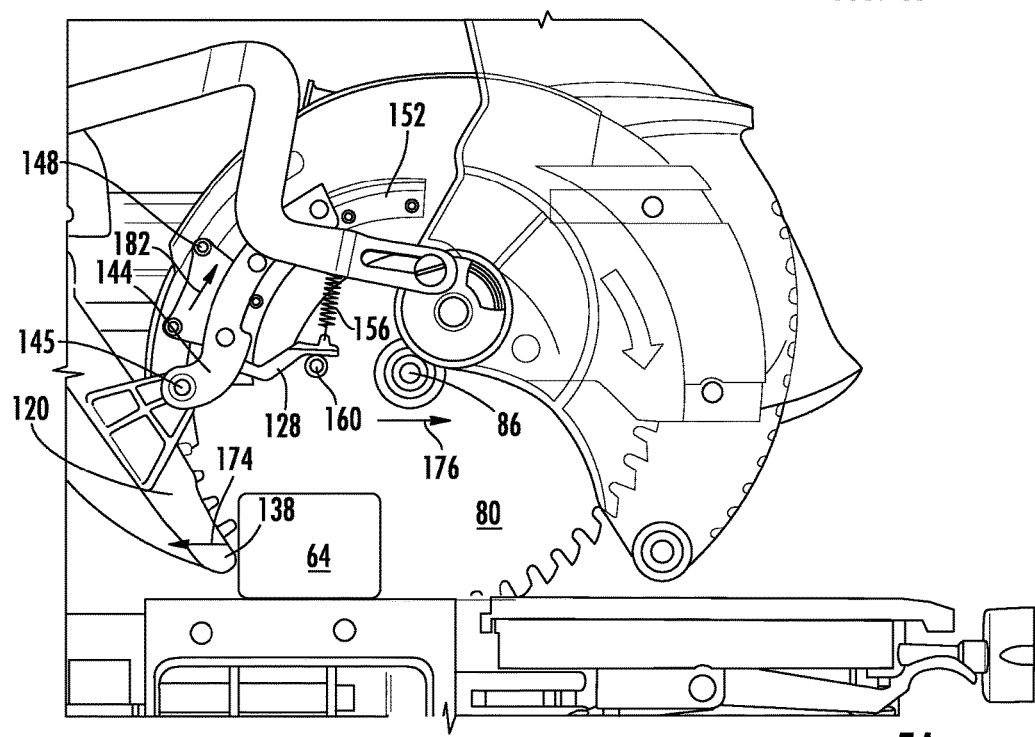
FIG. 5A is a side view of the miter saw and dust collection system of FIG. 1 with the dust chute pivoting and moving upwardly along the rear of the workpiece.
Figure 5B:
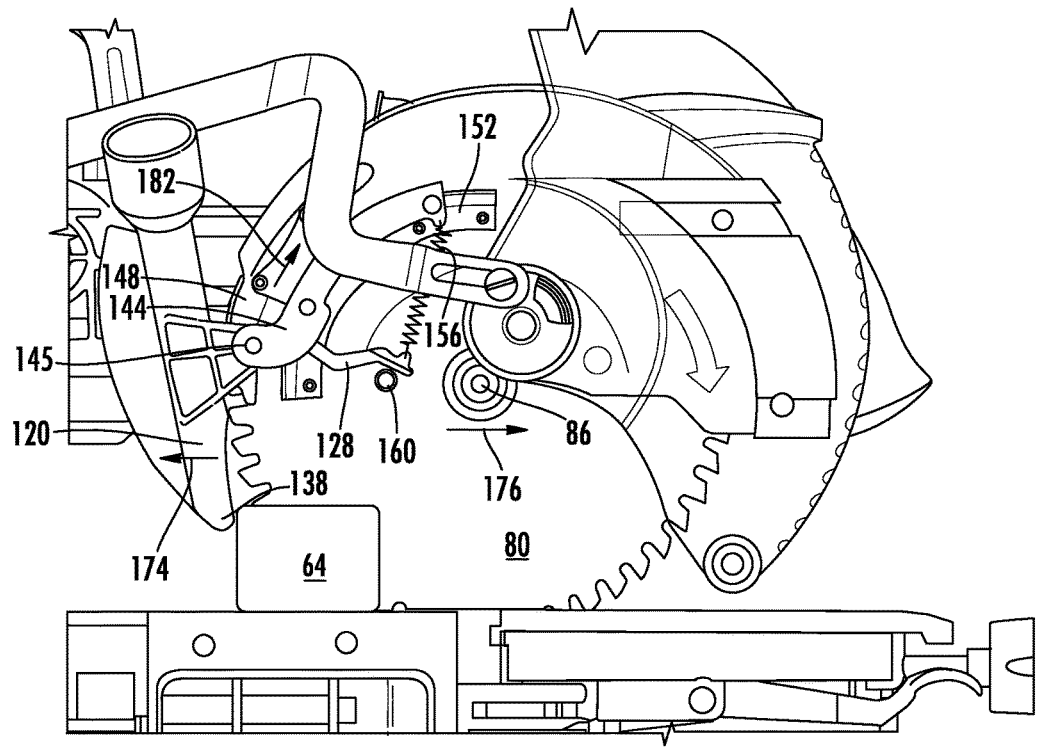
FIG. 5B is a side view of the miter saw and dust collection system of FIG. 1 with the dust chute pivoting and moving upwardly further along the rear of the workpiece.
Figure 5C:
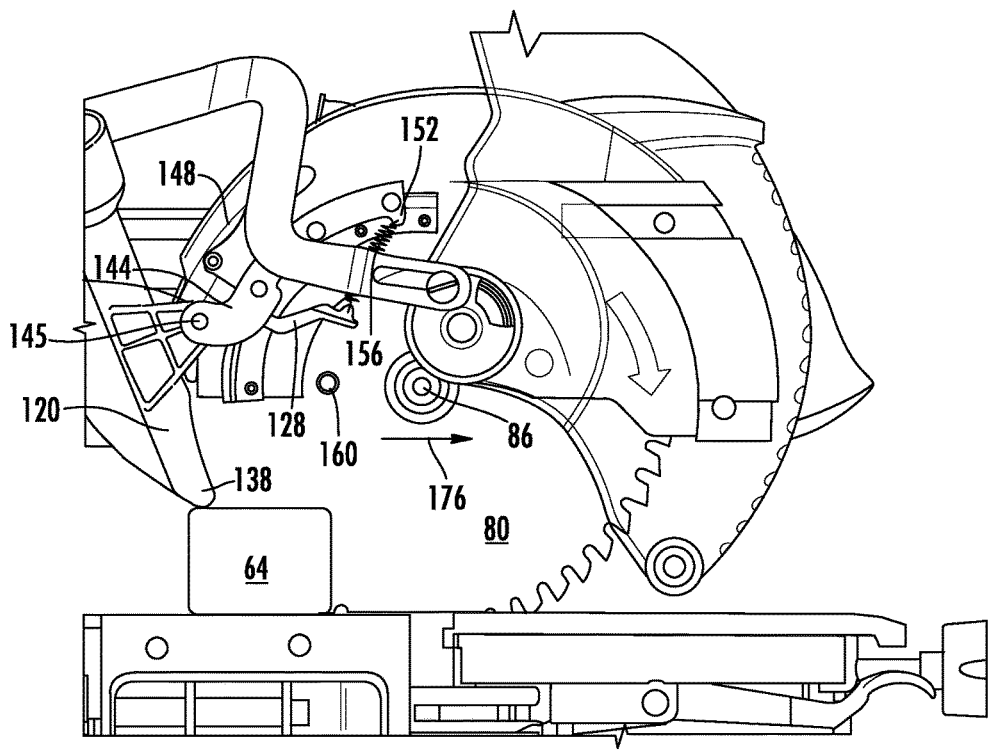
FIG. 5C is a side view of the miter saw and dust collection system of FIG. 1 with the dust chute reaching the top rear of the workpiece.
Figure 5D:
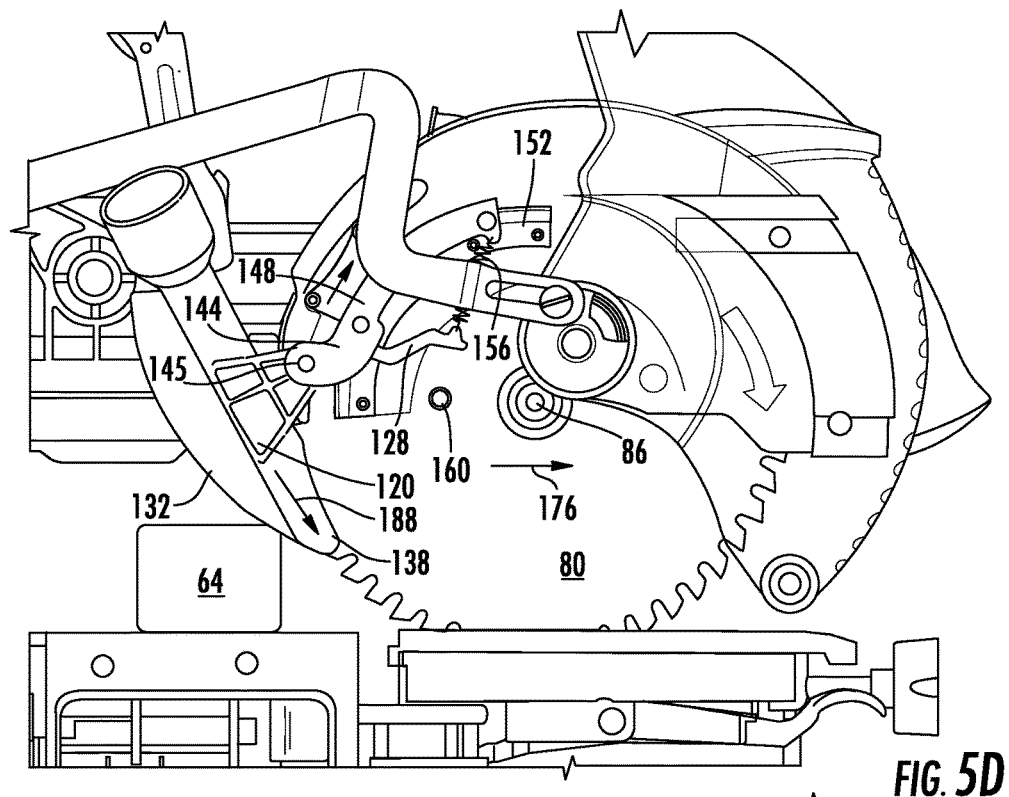
FIG. 5D is a side view of the miter saw and dust collection system of FIG. 1 with the dust chute sliding in front of the workpiece.
Figure 5E:
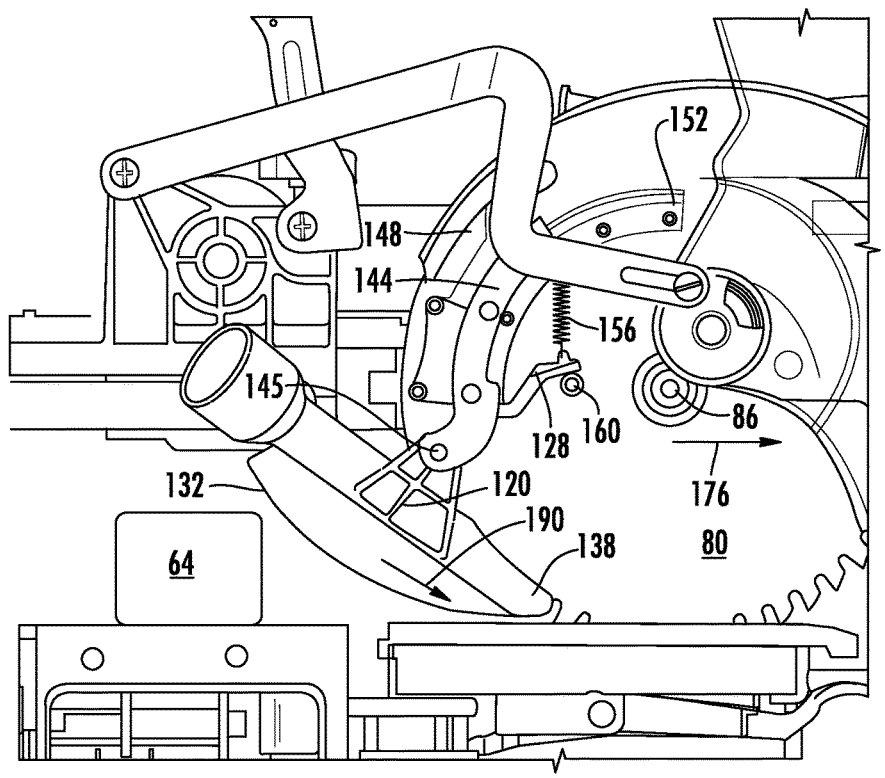
FIG. 5E is a side view of the miter saw and dust collection system of FIG. 1 with the dust chute returning to the starting position in front of the workpiece.

FIGS. 5A-5E illustrate the dust collecting system 100 disengaging from the workpiece 64 after the cutting operation is complete without catching on the workpiece 64. Once the cutting operation is complete, the user moves the saw in direction 176, as shown in FIG. 5A. The workpiece 64 produces a reaction force in direction 174 on the rounded end 132 of the dust chute 120. The dust chute 120 and sliding member 144 pivot in direction 182 about the virtual pivot point 86 while the pivot projection 128 remains engaged to the stop pin 160, limiting the pivoting of the dust chute 120 about the pivot pin 145. As the sliding member 144 and dust chute 120 continue to pivot in direction 182 about the virtual pivot point 86, the dust chute 120 moves upwardly along the rear surface of the workpiece 64 and the dust chute 120 begins pivoting around the pivot pin 145, as shown in FIG. 5B. As the rounded end 138 of the dust chute 120 reaches the top of the workpiece 64, the workpiece 64 no longer generates a reaction force on the dust chute 120 holding the pivot projection 128 on the stop pin 160, and the spring 156 pulls the pivot projection 128 off the stop pin 160, pivoting the dust chute 120 about the pivot pin 145 to the position shown in FIG. 5C. Further movement of the saw in direction 176 slides the rounded edge 138 of the dust chute 120 on the top of the workpiece 64 until the rounded edge 138 reaches the front of the workpiece 64, where gravity begins to pull the sliding member 144 downwardly about the virtual pivot point 86, moving the dust chute 120 in direction 188, as shown in FIG. 5D. The dust collection system 100 then returns to the initial position, as shown in FIG. 5E, as the dust chute 120 moves in direction 190.

Figure 6:
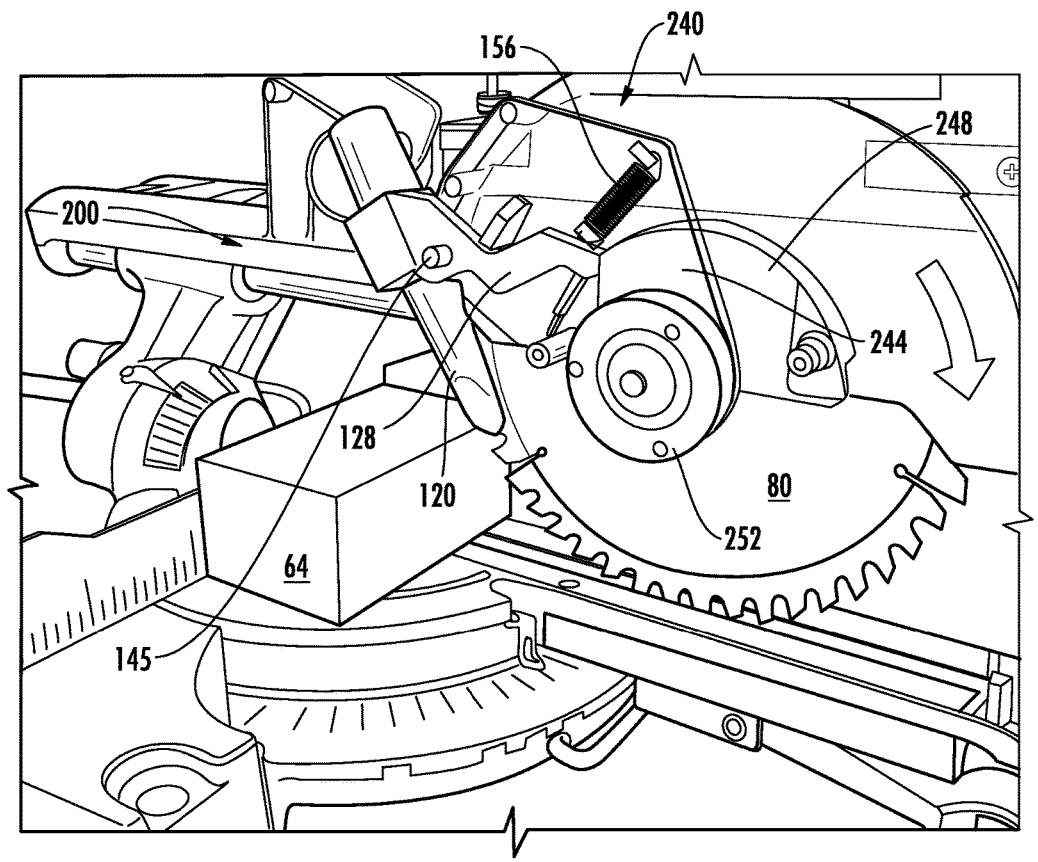
FIG. 6 is a side perspective view of a miter saw having another dust collection system.

Another dust collection system 200 is shown in FIG. 6. The dust collection system 200 includes a dust chute 120, configured similar to the dust chute 120 described above with reference to FIGS. 1-5E and including a pivot projection 128, and a cam system 240. The cam system 240 includes a carrier plate 244, a mounting plate 248, a rotary bearing 252, which, in some embodiments, is a ball bearing, and a spring 156. The rotary bearing 252 is centered about the center of the saw blade 80, and fixedly mounted to the mounting plate 248. The rotary bearing 252 is operatively connected to the carrier plate 244, and is configured such that the carrier plate 244 is rotatable about the center of the rotary bearing 252.

The embodiment of FIG. 6 operates substantially the same as the embodiment of FIGS. 1-5E with the exception that the rotary bearing 252 replaces the virtual pivot point as the pivoting mechanism. The carrier plate 244 pivots about the center of the rotary bearing 252 to move the dust chute 120 upwardly as the saw blade 80 cuts the workpiece 64. The spring 156 and the pivot projection 128 operate in the same manner as described above with reference to FIGS. 1-5E to retain the dust chute 120 in position to receive the dust and debris generated during a cutting operation.

The present disclosure contemplates a dust and debris collection system for use with a power tool in which the workpiece and tool translate relative to each other. In one aspect, the collection system includes a dust chute configured to pull dust and debris and a support system that allows the dust chute to travel over and beyond the workpiece during the relative translation of the workpiece and the power tool.

Figure 7A:
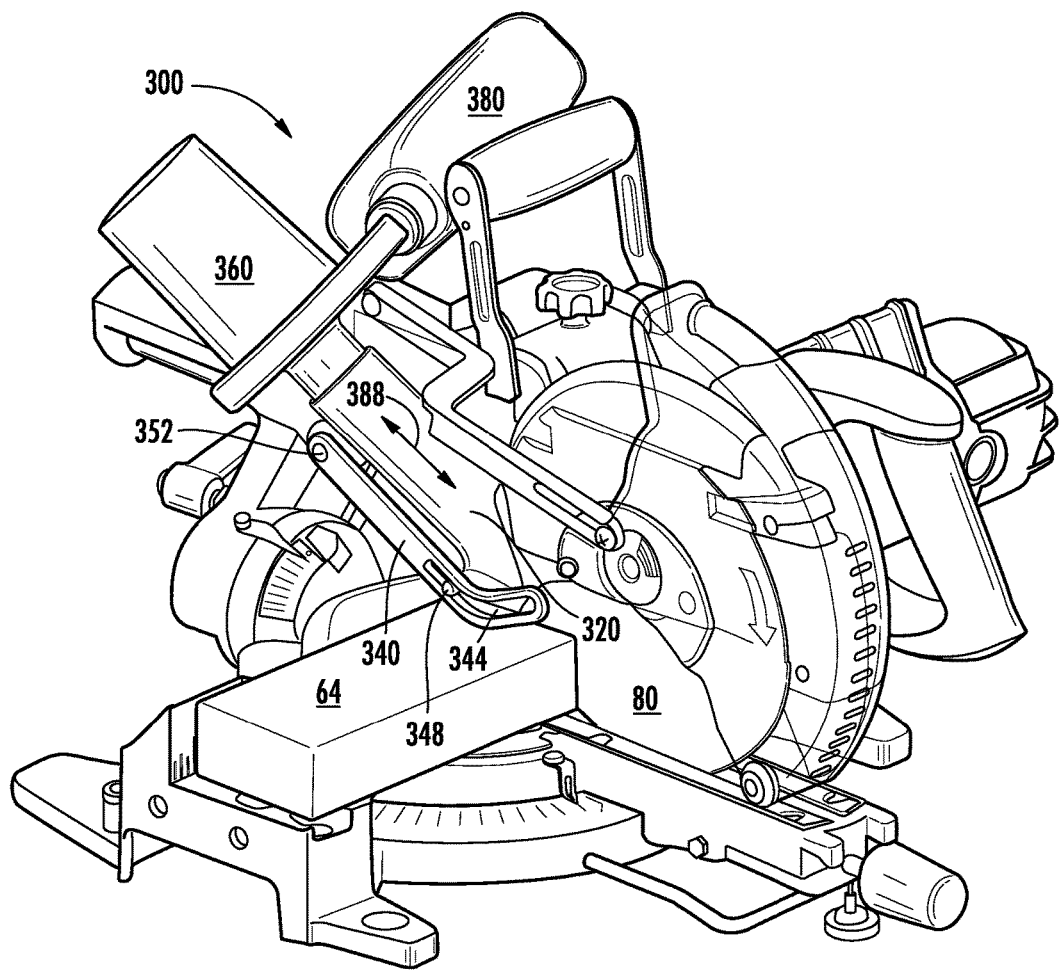
FIG. 7A is a side perspective view of a miter saw having yet another dust collection system.
Figure 7B:
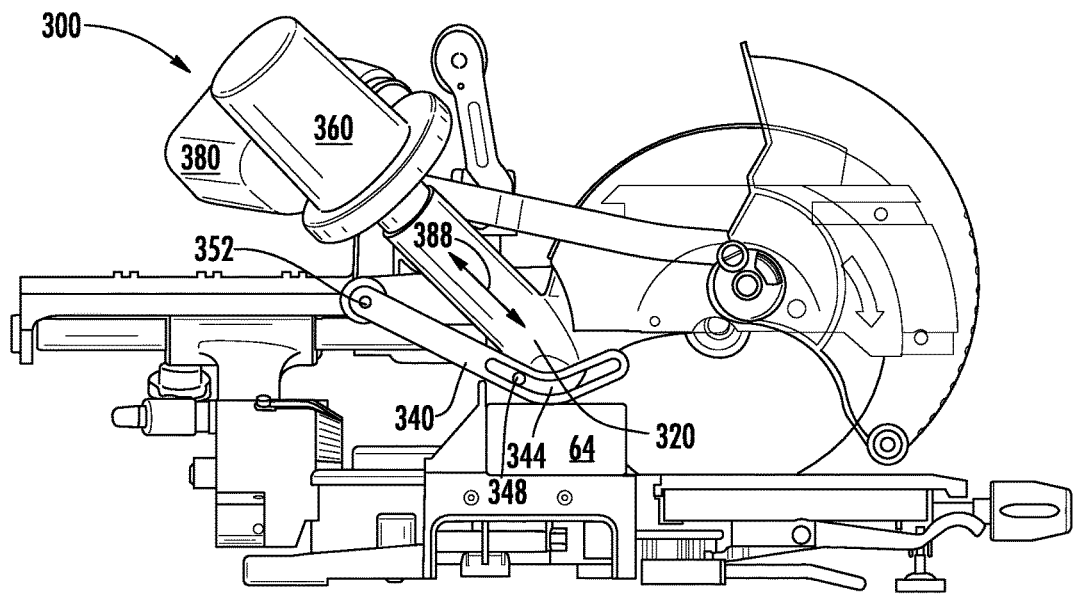
FIG. 7B is a side view of the miter saw and dust collection system of FIG. 7A.

The dust collection systems disclosed herein also contemplate components for collecting the dust and debris in a container for easy disposal. In one embodiment, this is shown in FIGS. 7A and 7B, which illustrates a dust collection system 300 for a circular saw. The dust collection system 300 includes a dust chute 320, a guide member 340, an exhaust blower 360, and a collection bag 380. The dust chute 320 partially surrounds the saw blade 80 to collect dust and debris generated as the saw blade 80 cuts the workpiece 64. The guide member 340 includes a guide slot 344, a guide pin 348, and a pivot pin 352. The guide pin 348 is positioned within the guide slot 344 and is operatively connected to the dust chute 320. The guide pin 348 slides within the guide slot 344 to move the dust chute 320 in direction 388. The guide member 340 pivots about the pivot pin 352 to enable the dust chute 320 to reach the base of the saw table, at which position the guide pin is at the forward end of the slot 344. The pivoting of the guide member 340 and the sliding of the guide pin 348 enable the dust chute 320 to remain adjacent to the workpiece 64 as the saw blade 80 cuts the workpiece 64, such that the dust chute 320 collects dust and debris produced during the cutting operation.

The exhaust blower 360 is configured with a motor (not shown) that generates a negative pressure within the dust chute 320 to enable the dust chute 320 to extract air from about the saw blade 80 and capture the dust and debris from the cutting operation. The exhaust blower 360 pushes the dust and debris into the collection bag 380 for subsequent removal and disposal of the dust and debris.

Figure 8:
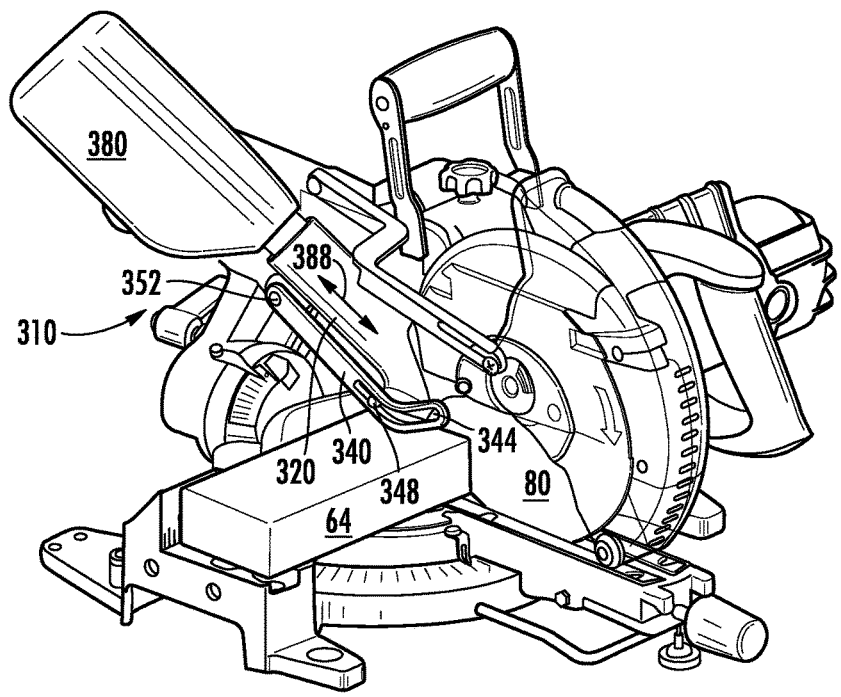
FIG. 8 is a side perspective view of a miter saw having a dust collection system.

FIG. 8 depicts another dust collection system 310 for a circular saw. The dust collection system 310 is substantially the same as the dust collection system 300, with the exception that dust collection system 310 does not include an exhaust blower. The saw blade 80 cuts through the workpiece 64, ejecting air, dust, and debris tangentially to the saw blade 80. The airflow generated by the spinning saw blade 80 is sufficient to push the dust and debris through the dust chute 320 into the collection bag 380 without the need for an exhaust blower to move the air through the dust chute 320 to the collection bag 380.

Figure 9A:
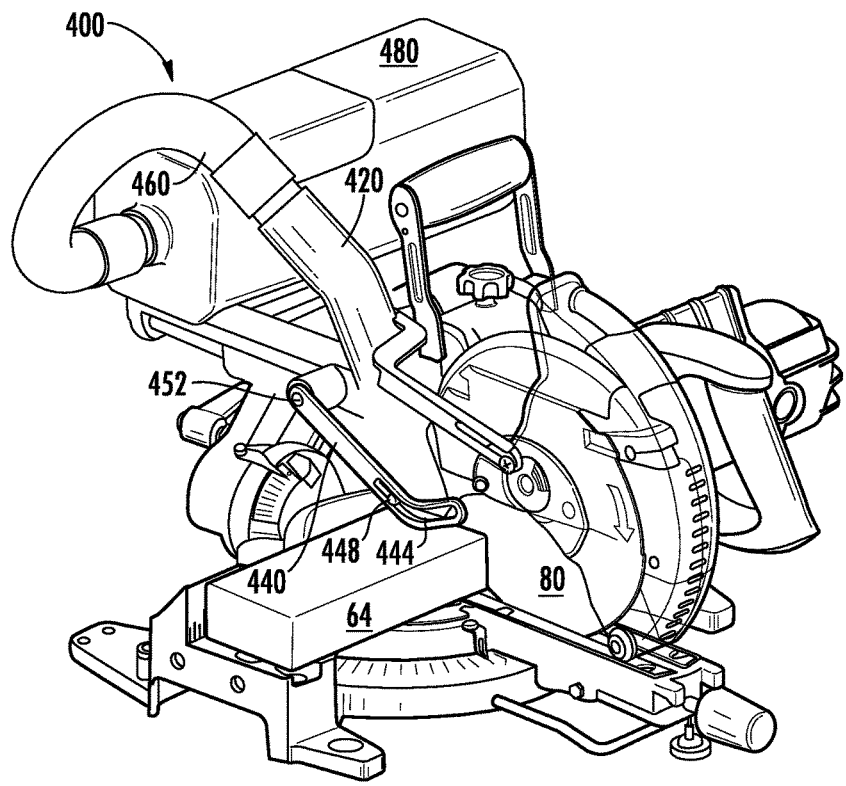
FIG. 9A is a side perspective view of a miter saw having another embodiment of a dust collection system.
Figure 9B:
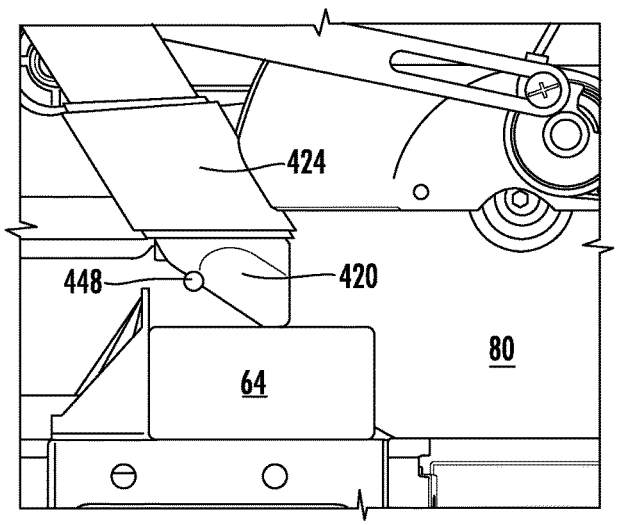
FIG. 9B is a side detail view of the miter saw and dust collection system of FIG. 9A.
Figure 9C:
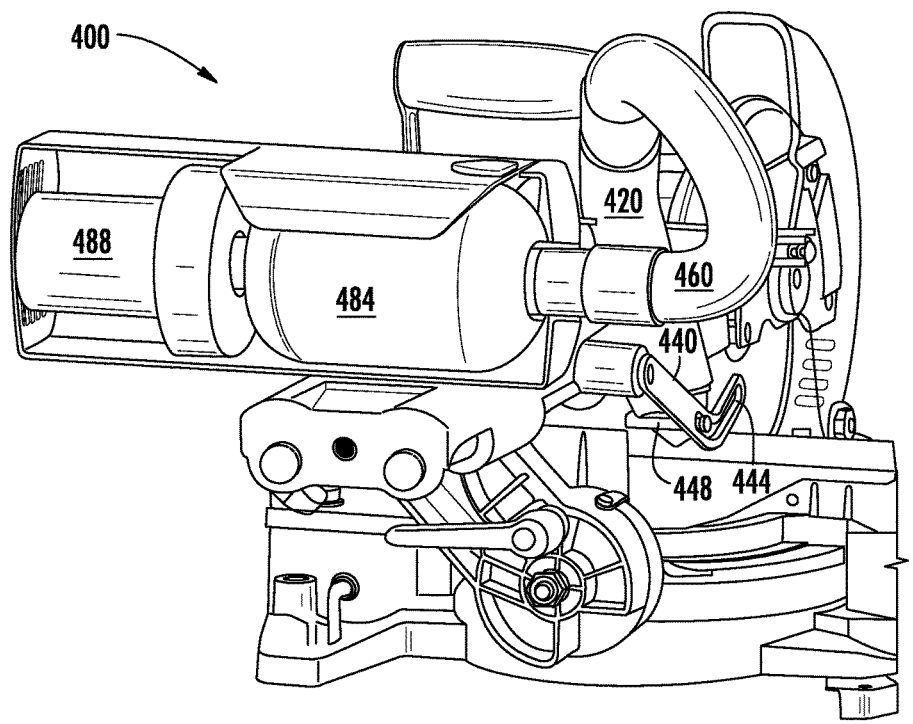
FIG. 9C is a perspective schematic view of the dust cleaner of the miter saw and dust collection system of FIG. 9A.

FIGS. 9A-9C illustrate another dust collection system 400 for a circular saw. The dust collection system 400 includes a dust chute 420, a guide member 440, a connecting hose 460, and an exhauster 480. The dust chute 420 partially surrounds the saw blade 80 to collect dust and debris generated as the saw blade 80 cuts a workpiece 64. The dust chute 420 includes a hose 424 that, in one embodiment, is flexible to enable the dust chute 420 to be oriented in a variety of positions. The guide member 440 includes a guide slot 444 and a guide pin 448. The guide pin 448 is positioned within the guide slot 444 and is operatively connected to the dust chute 420. The guide pin 448 slides within the guide slot 444 to move the dust chute 420 in direction 488. The guide member 440 pivots about the pivot pin 452 to enable the dust chute 420 to reach the base of the saw table, at which position the guide pin is at the forward end of the slot 444. The pivoting of the guide member 440 and the sliding of the guide pin 448 enable the dust chute 420 to remain adjacent to the workpiece 64 as the saw blade 80 cuts the workpiece 64, such that the dust chute 420 collects dust and debris produced during the cutting operation.

The connecting hose 460 is adjustable to transport dust and debris from the dust chute 420 to the exhauster 480. The exhauster 480 includes a debris collector 484 (FIG. 9C) and an exhaust fan 488. The exhaust fan 488 generates a negative pressure in the debris collector 484 to pull air, dust, and debris from the cutting operation through the dust chute 420 and connecting hose 460. In the embodiment of FIGS. 9A-9C, the exhauster 480 is movable, and can be positioned by the user in any suitable location near the saw due to the adjustability of the connecting hose 460. In one embodiment, the exhauster includes a magnet to enable the exhauster to be temporarily mounted to a magnetic surface near the saw.

Figure 10A:
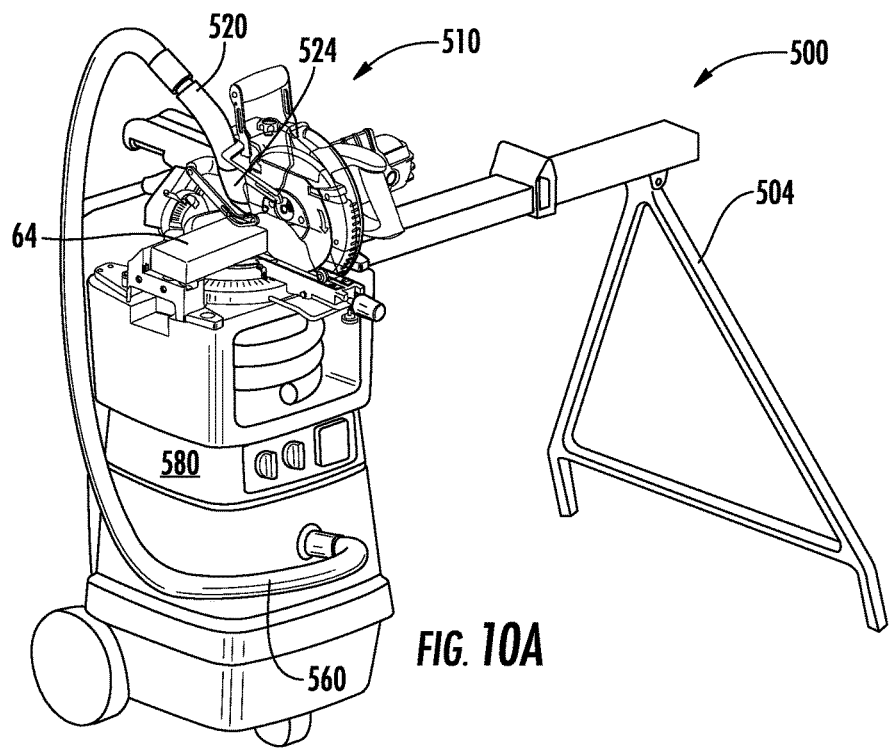
FIG. 10A is a front perspective view of a miter saw having a dust collection system.
Figure 10B:
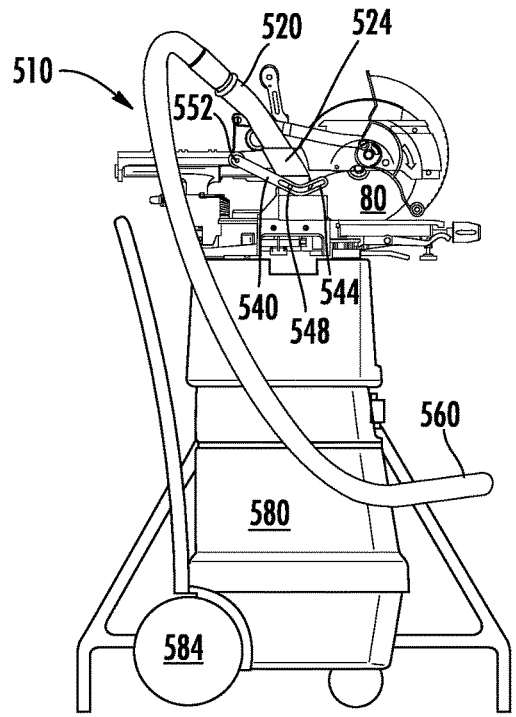
FIG. 10B is a side view of the miter saw and dust collection system of FIG. 10A.

FIGS. 10A and 10B illustrate another dust collection system 510 for a circular saw system 500. The circular saw system 500 includes a workpiece stand 504 that supports a workpiece 64 during a cutting operation. The dust collection system 510 includes a dust chute 520, a guide member 540, a connecting hose 560, and a vacuum 580. The dust chute 520 partially surrounds the saw blade 80 to collect dust and debris generated as the saw blade 80 cuts a workpiece 64. The dust chute 520 includes a hose 524 that is flexible to enable the dust chute 520 to be oriented in a variety of positions. The guide member 540 includes a guide slot 544 and a guide pin 548. The guide pin 548 is positioned within the guide slot 544 and is operatively connected to the dust chute 520. The guide pin 548 slides within the guide slot 544 to move the dust chute 520 in direction 588. The guide member 540 pivots about the pivot pin 552 to enable the dust chute 520 to reach the base of the saw table, at which position the guide pin is at the forward end of the slot 544. The pivoting of the guide member 540 and the sliding of the guide pin 548 enable the dust chute 520 to remain adjacent to the workpiece 64 as the saw blade 80 cuts the workpiece 64, such that the dust chute 520 collects dust and debris produced during the cutting operation.

The connecting hose 560 fluidly connects the dust chute 520 to the vacuum 580 to transport the dust and debris collected by the dust chute 520 to the vacuum 580. The connecting hose 560 is adjustable to enable the dust chute 520 to be moved with respect to the vacuum 580. The vacuum 580 is configured to generate a negative pressure in the connecting hose 560 and the dust chute 520 to extract air through the dust chute 520 and collect the dust and debris generated during the cutting operation. The saw is mounted on the vacuum 580, which serves to support the saw during cutting operations. The vacuum 580 includes wheels 584, to enable the circular saw system 500 to be moved between cutting operations, and a collection bag (not shown) to collect the dust within the vacuum 580 for subsequent disposal.

Figure 11A:
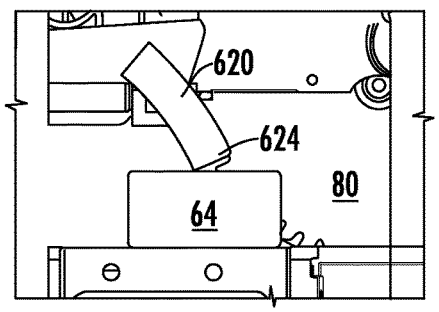
FIG. 11A is a side view of a dust collection chute for a dust collection system for a miter saw on the top of a workpiece.
Figure 11B:
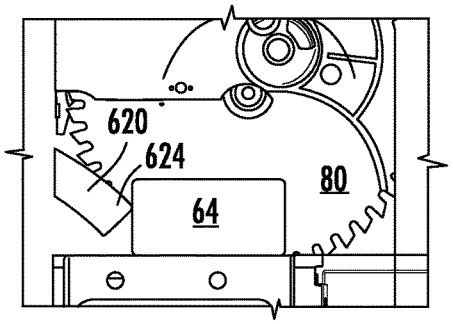
FIG. 11B is a side view of the dust collection chute of FIG. 11A contacting the rear of the workpiece.
Figure 11C:
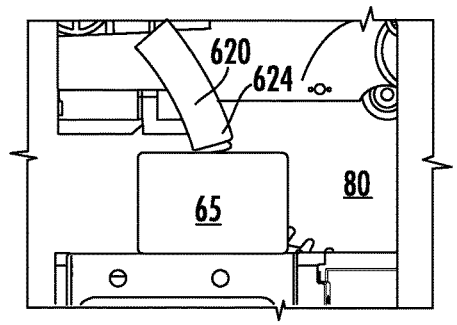
FIG. 11C is a side view of the dust collection chute of FIG. 11A on top of a thick workpiece.
Figure 11D:
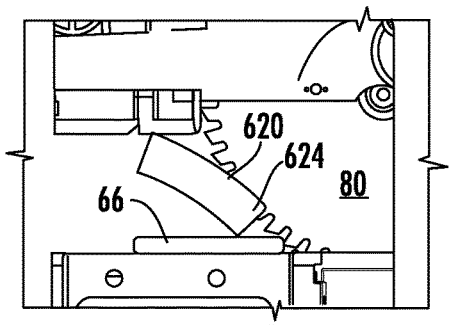
FIG. 11D is a side view of the dust collection chute of FIG. 11A on top of a thin workpiece.

FIGS. 11A-11F illustrate a dust chute 620 having a flat end 624 for use with a dust collection system such as the dust collection system 100 described with reference to FIGS. 1-5E. The dust chute 620 is positioned on top of the workpiece 64 as the saw blade 80 cuts the workpiece, as shown in FIG. 11A. The dust chute 620 moves around the top rear corner of the workpiece 64 as the saw blade 80 is moved further into the workpiece 64. FIG. 11B depicts the flat end 624 of the dust chute 620 sliding down the rear surface of the workpiece 64 as the saw blade 80 is nearly finished cutting the workpiece 64, and the dust chute 624 moves to a position behind the workpiece 64 after the saw blade 80 has completed the cutting operation. FIG. 11C depicts the flat end 624 of the dust chute 620 against the top surface of a thick workpiece 65, while FIG. 11D depicts the flat end 624 of the dust chute 620 against the top surface of a thin workpiece 66.

Figure 12A:
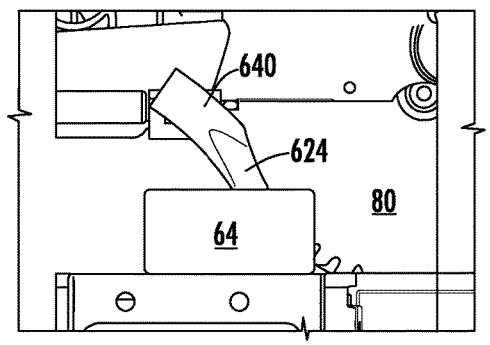
FIG. 12A is a side view of a dust collection chute for a dust collection system for a miter saw on the top of a workpiece.
Figure 12B:
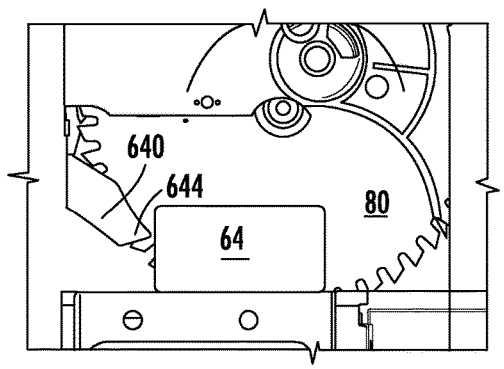
FIG. 12B is a side view of the dust collection chute of FIG. 12A contacting the rear of the workpiece.
Figure 12C:
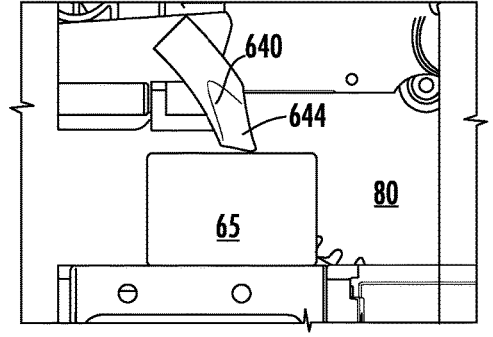
FIG. 12C is a side view of the dust collection chute of FIG. 12A on top of a thick workpiece.
Figure 12D:
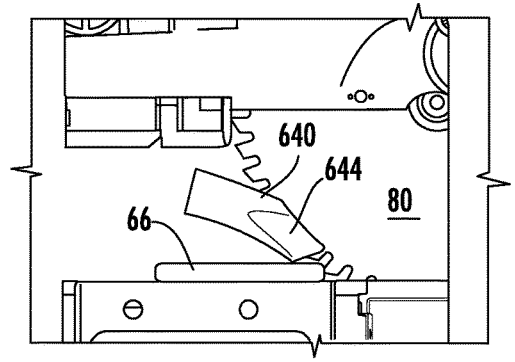
FIG. 12D is a side view of the dust collection chute of FIG. 12A on top of a thin workpiece.

FIGS. 12A-12D illustrate a dust chute 640 having a curved end 644 with a flat lower surface for use with a dust collection system such as the dust collection system 100 described with reference to FIGS. 1-5E. The flat lower surface of the curved end 644 of the dust chute 640 is positioned on top of the workpiece 64 as the saw blade 80 cuts the workpiece, as shown in FIG. 12A, and is configured to slide along the top surface of the workpiece 64. The curved portion of the curved end 644 is adapted to the outer circumference of the saw blade 80 to enable the curved end 644 to partially encompass a portion of the saw blade 80. The dust chute 640 then moves around the top rear corner of the workpiece 64 as the saw blade 80 is moved further into the workpiece 64. FIG. 12B depicts the curved end 644 of the dust chute 640 sliding down the rear surface of the workpiece 64 as the saw blade 80 is nearly finished cutting the workpiece 64. The dust chute 640 is positioned behind the workpiece 64 after the saw blade 80 has completed the cutting operation. FIG. 12C depicts the curved end 644 of the dust chute 640 against the top surface of a thick workpiece 65, while FIG. 12D depicts the curved end 644 of the dust chute 640 against the top surface of a thin workpiece 66.

Figure 13A:
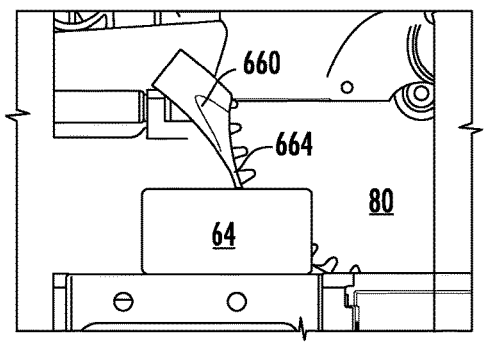
FIG. 13A is a side view of a dust collection chute for a dust collection system for a miter saw on the top of a workpiece.
Figure 13B:
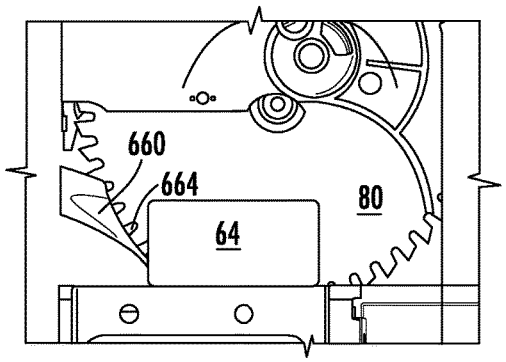
FIG. 13B is a side view of the dust collection chute of FIG. 13A contacting the rear of the workpiece.
Figure 13C:
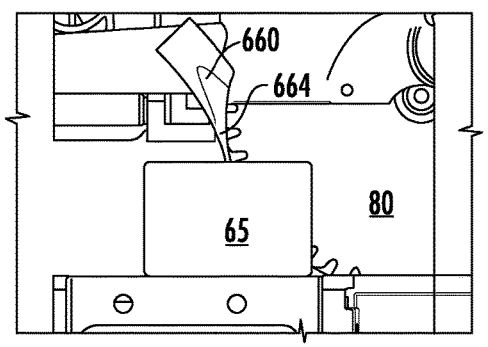
FIG. 13C is a side view of the dust collection chute of FIG. 13A on top of a thick workpiece.
Figure 13D:
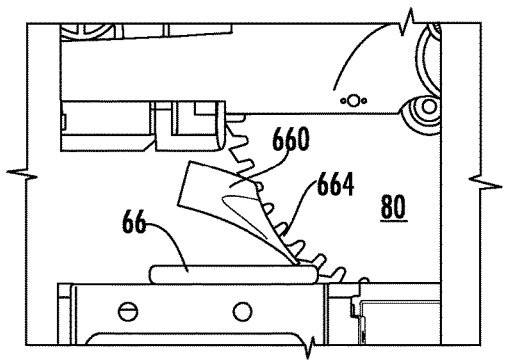
FIG. 13D is a side view of the dust collection chute of FIG. 13A on top of a thin workpiece.

FIGS. 13A-13D illustrate a dust chute 660 having a curved end 664 for use with a dust collection system such as the dust collection system 100 described with reference to FIGS. 1-5E. The dust chute 660 is positioned on top of the workpiece 64 as the saw blade 80 cuts the workpiece, as shown in FIG. 13A. The tip of the curved end 664 slides along the top surface of the workpiece 64 as the saw blade 80 cuts the workpiece 64. The curved portion of the curved end 664 remains adjacent to the saw blade 80 and the workpiece 64 during the cutting operation to collect dust and debris produced as the saw blade 80 cuts the workpiece 64. The dust chute 660 then moves around the top rear corner of the workpiece 64 as the saw blade 80 is moved further into the workpiece 64. FIG. 13B depicts the curved end 664 of the dust chute 660 sliding down the rear surface of the workpiece 64 as the saw blade 80 is nearly finished cutting the workpiece 64. Once the saw blade 80 has completed the cutting operation, the dust chute 660 moves to a position behind the workpiece 64. FIG. 13C depicts the curved end 664 of the dust chute 660 against the top surface of a thick workpiece 65, while FIG. 13D depicts the curved end 664 of the dust chute 660 against the top surface of a thin workpiece 66.

Figure 14A:
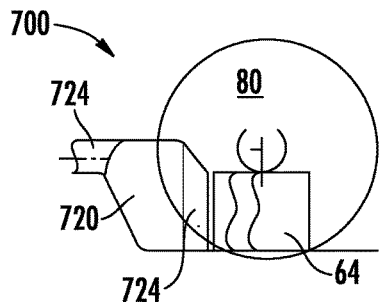
FIG. 14A is a side schematic view of a dust control system for a circular saw.
Figure 14B:
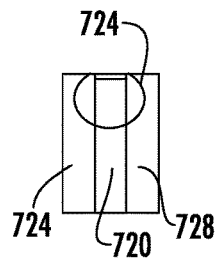
FIG. 14B is a front schematic view of the dust control system of FIG. 14A.
Figure 14C:
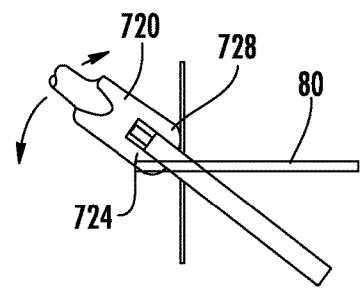
FIG. 14C is a top schematic view of the dust control system of FIG. 14A.

FIGS. 14A-14C illustrate another embodiment of a dust collection system 700 for a circular saw. The dust collection system 700 includes a dust chute 720 that has two extensions 724 and 728, each of which extends around a side of a circular saw blade 80 to partially surround the circular saw blade 80 and collect dust generated as the saw blade 80 cuts a workpiece 64. The dust collection system 700 is pivotable about the circular saw to enable the user to position the dust collection 700 at a desired position with respect to the workpiece 64 and saw blade 80.

Figure 15:
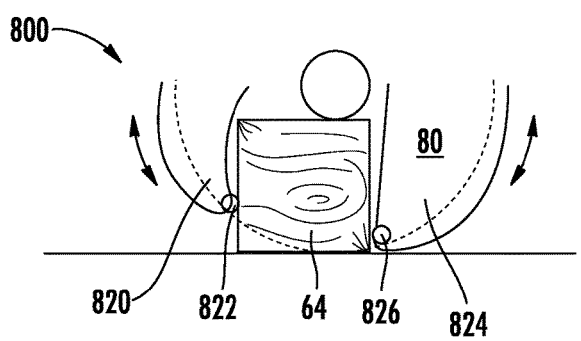
FIG. 15 is a side schematic view of a dust control system for a circular saw.

FIG. 15 depicts a dust collection cover 800 for a circular saw. The dust collection cover 800 has a front pivoting cover 824 and a rear pivoting cover 820, each of which partially surrounds the saw blade 80 and includes a roller 826 and 822, respectively. The rollers 822 and 826 are configured to roll along the surfaces of the workpiece 64 to urge the rear and front pivoting covers 820 and 824, respectively, to pivot and remain close enough to the saw blade 80 to catch dust and debris generated during cutting of the workpiece 64.

Figure 16:
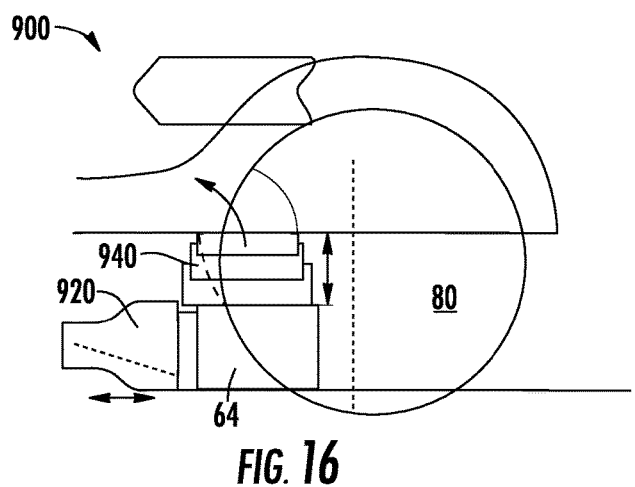
FIG. 16 is a side schematic view of a dust control system for a circular saw.

FIG. 16 illustrates a dust collection system 900 for a circular saw. The dust collection system 900 includes a first dust chute 920 and a second dust chute 940. The first dust chute 920 is positioned behind the workpiece 64 in the direction of the saw travel such that the first dust chute 920 collects dust ejected behind the workpiece 74. The second dust chute 940 is vertically adjustable and is configured to rest atop the workpiece 64 to collect dust ejected upwardly as the saw blade 80 cuts the workpiece 64.

Figures 17A, 17B:
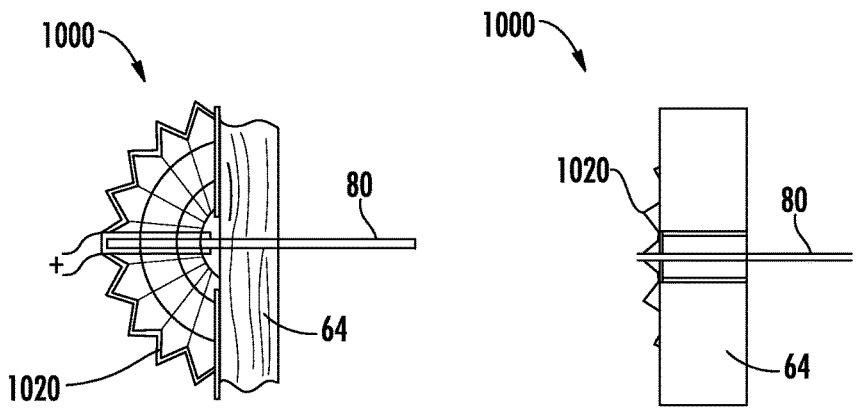
FIG. 17A is a top schematic view of a dust control system for a circular saw.
FIG. 17B is a top schematic view of the dust control system of FIG. 17A.

FIGS. 17A and 17B illustrate a dust collection system 1000 for a circular saw. The dust collection system 1000 includes a flexible rubber gaiter 1020 positioned behind the workpiece 64. The flexible gaiter 1020 is configured to expand to the position of FIG. 17A as the circular saw blade 80 spins to collect dust generated as the saw blade 80 cuts the workpiece 64. When the circular saw is deactivated, the flexible gaiter 1020 retracts to the position of FIG. 17B.

Figure 18:
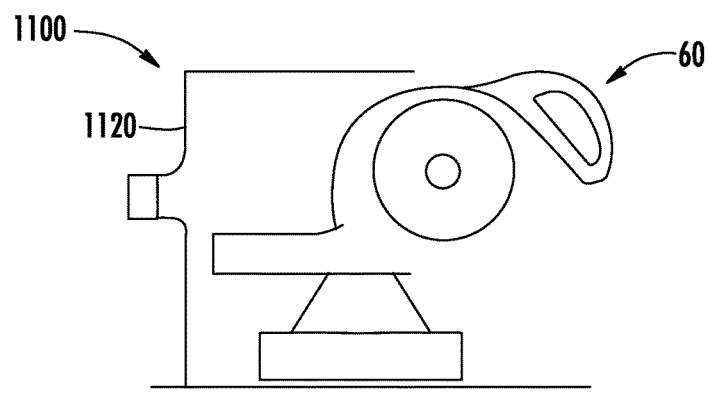
FIG. 18 is a side schematic view of a dust control system for a circular saw.

FIG. 18 illustrates another dust collection system 1100 for a miter saw 60. The dust collection system 1100 includes a hood 1120 that completely covers the miter saw 60. The hood 1120 prevents dust from escaping and enables simplified collection of the dust after use of the miter saw.

Figure 19:
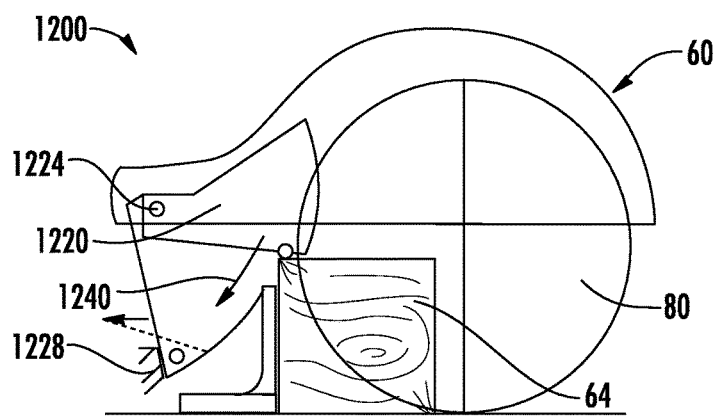
FIG. 19 is a side schematic view of a dust control system for a circular saw.

FIG. 19 depicts another dust collection system 1200 for a miter saw 60. The dust collection system 1200 includes a pivotable dust chute 1220 that pivots about a pivot pin 1224. The dust chute 1220 is configured to partially encapsulate the saw blade 80 as the saw blade 80 cuts the workpiece 64. The dust chute 1220 rests on the top surface of the workpiece 64 as the cutting operation is performed, and pivots against a stop 1228 when the cutting operation is completed.

Figure 20A:
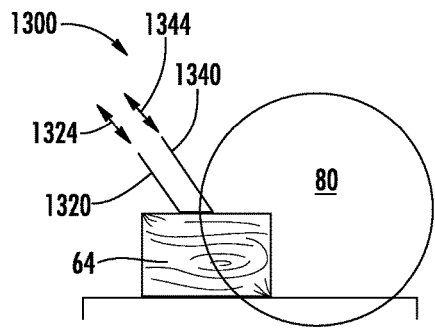
FIG. 20A is a side schematic view of a dust control system for a circular saw.
Figure 20B:
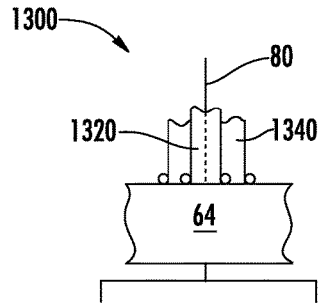
FIG. 20B is a rear schematic view of the dust control system of FIG. 20A.

FIGS. 20A and 20B depict another dust collection system 1300 for a miter saw. The dust collection system 1300 includes a first band 1320 and a second band 1340. In one embodiment, the bands 1320 and 1340 are made of an elastomeric material, though other materials are used in other embodiments. The elastic bands 1320 and 1340 are configured to slide in directions 1324 and 1344, respectively, as the circular saw blade 80 cuts the workpiece 64 and pushes the bands 1320 and 1340 from their resting position on the top surface of the workpiece 64. The bands 1320 and 1340 are configured to block dust and debris from spraying outwardly as the saw blade 80 cuts the workpiece 64.

Figure 21:
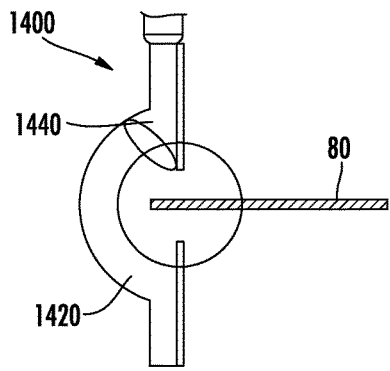
FIG. 21 is a top schematic view of a dust control system for a circular saw.

FIG. 21 depicts another dust collection system 1400 for a circular saw. The dust collection system 1400 includes a dust shield 1420 and a dust chute 1440. The dust shield 1420 extends behind and partially beside the saw blade 80 to retain dust and debris from a cutting operation near the saw blade 80. The dust chute 1440 is connected to a vacuum (not shown) that generates a negative pressure to extract the dust and debris from near the saw blade 80 through the dust chute 1440.

Figure 22:
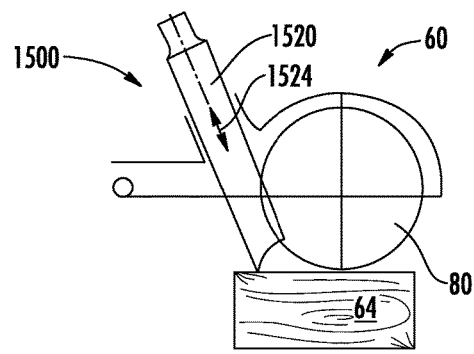
FIG. 22 is a side schematic view of a dust control system for a circular saw.

FIG. 22 depicts another dust collection system 1500 for a miter saw 60. The dust collection system 1500 includes a dust chute 1520 that is configured to translate in direction 1524 as the saw blade 80 cuts the workpiece 64. The dust chute 1520 is configured to rest on a top surface of the workpiece 64 as the blade 80 cuts the workpiece to remain adjacent the blade 80 to collect the dust and debris generated during the cutting operation.

Figure 23:
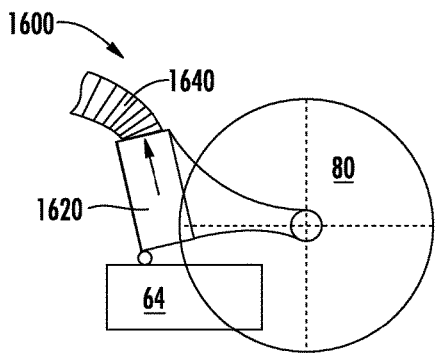
FIG. 23 is a side schematic view of a dust control system for a circular saw.

FIG. 23 depicts a dust collection system 1600 for a circular saw. The dust collection system 1600 includes a dust chute 1620 that is configured to pivot about the center of the saw blade 80 as the saw blade 80 cuts the workpiece 64. The dust chute 1620 rests on the top surface of the workpiece 64 as the blade 80 cuts the workpiece to remain adjacent the blade 80 and collect the dust and debris generated during the cutting operation. The dust chute 1620 is connected to an adjustable hose 1640 to deliver the dust and debris collected by the dust chute 1620 to a collection area (not shown). In some embodiments, the adjustable hose is connected to a vacuum source to generate a suction to move the dust and debris toward the collection area.

Figure 24:
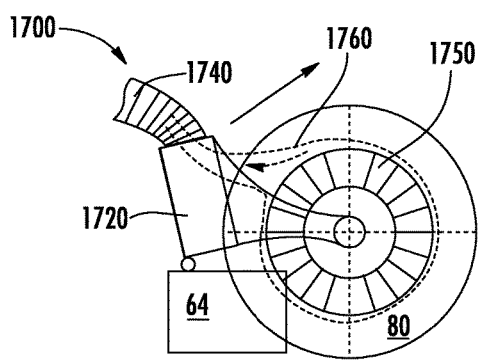
FIG. 24 is a side schematic view of a dust control system for a circular saw.

FIG. 24 depicts a dust collection system 1700 for a circular saw. The dust collection system 1700 includes a dust chute 1720 that is configured to pivot about the center of the saw blade 80 as the saw blade 80 cuts the workpiece 64. The dust chute 1720 rests on the top surface of the workpiece 64 as the blade 80 cuts the workpiece to remain adjacent the blade 80 and collect the dust and debris generated during the cutting operation. The dust chute 1720 is connected to an adjustable hose 1740 to deliver the dust and debris collected by the dust chute 1720 to a storage location. An air collector 1760 collects air expelled by a motor fan 1750 that is configured to cool a motor (not shown) that operates the saw blade 80. The air collector 1760 channels the air into the dust chute 1720 and connecting hose 1740 to push the dust and debris through the dust chute 1720 and connecting hose 1740.

FIGS. 25A and 25B depict a dust collection system 1800 for a circular saw. The dust collection system 1800 includes a dust chute 1820 that is configured to be manually positioned by an operator on the workpiece 64. The dust chute 1820 collects dust and debris ejected as the saw blade 80 cuts the workpiece 64.

FIGS. 26A and 26B depict a dust collection system 1900 for a circular saw. The dust collection system 1900 includes two brushes 1920 and 1940 that are configured to spin. The brushes 1920 and 1940 are positioned on opposite sides of the saw blade 80 to direct dust and debris generated as the saw blade cuts the workpiece 64 behind the saw for collection. The brushes 1920 and 1940 are further configured such that the brushes 1920 and 1940 do not interfere with the saw blade 80 as the blade spins.

FIG. 27 depicts a dust collection system 2000 for a circular saw. The dust collection system 2000 includes a water sprayer 2020, a dust shield 2040, and a drain 2060. The dust shield 2040 blocks dust and debris from being ejected upwardly as the saw blade 80 cuts a workpiece. The water sprayer 2020 sprays a diffuse shower of water on the saw blade 80 to knock dust and debris particles out of the air and into the drain 2060. The drain 2060 collects the water, dust, and debris and delivers it to a collection area for subsequent disposal.

Figure 28A:
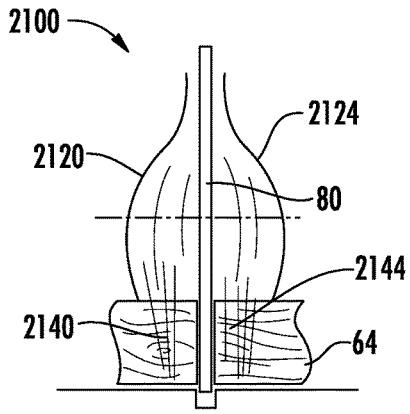
FIG. 28A is a front schematic view of a dust control system for a circular saw.
Figure 28B:
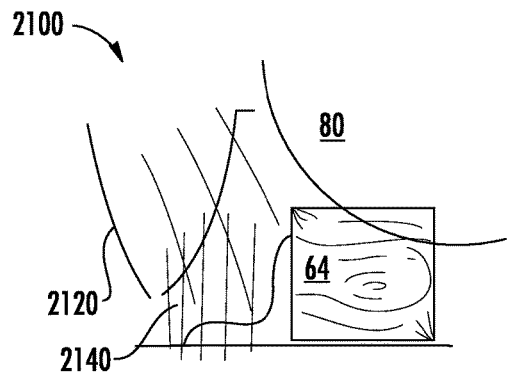
FIG. 28B is a side detail schematic view of the dust control system of FIG. 28A.

FIGS. 28A and 28B depict a dust collection system 2100 for a circular saw. The dust collection system 2100 includes two curtains 2120 and 2124 positioned on opposite sides of the saw blade 80. The dust collection system 2100 further includes two brushes 2140 and 2144 mounted to the base of the saw behind the workpiece 64 on opposite sides of the saw blade 80. The airflow generated by the spinning of the circular saw 80 during cutting is channeled between the brushes 2140 and 2144 and the curtains 2120 and 2124 to direct dust and debris generated as the saw blade cuts the workpiece 64 to a collection area for disposal.

Figure 29:
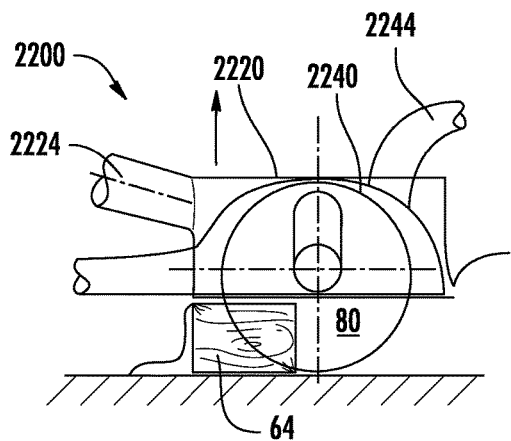
FIG. 29 is a side schematic view of a dust control system for a circular saw.

FIG. 29 depicts a dust collection system 2200 for a circular saw. The dust collection system 2200 includes a dust hood 2220, a suction channel 2224, and a saw guard 2240. The saw guard 2240 partially surrounds the saw blade 80 to prevent user contact with the blade 80, and includes a handle 2244 to enable the user to pivot and slide the saw blade 80. The dust hood 2220 is attached to the saw guard 2240 and is configured to move with the saw guard 2240. The suction channel 2224 is attached to the dust hood 2220 and is connected to a vacuum to enable the suction channel 2224 to generate a negative pressure in the dust hood 2220. The negative pressure in the dust hood 2220 pulls dust and debris generated during cutting of the workpiece 64 into the suction channel 2224 and to a collection area for subsequent disposal.

Figure 30:
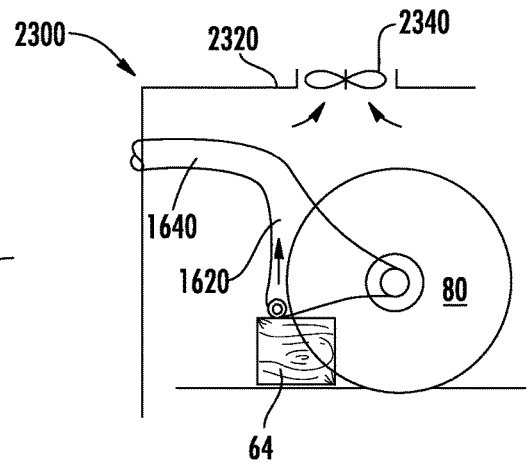
FIG. 30 is a side schematic view of a dust control system for a circular saw.

FIG. 30 depicts another dust collection system 2300 for a circular saw. The dust collection system 2300 includes a dust chute 1620 and an adjustable hose 1640 that are configured substantially the same as the dust chute and adjustable hose described above with reference to FIG. 23. The dust collection system further includes a hood 2320 having a ventilation fan 2340. The hood 2320 prevents egress of dust particles that are not captured by the dust chute 1620 from leaving the immediate area of the circular saw. The ventilation fan 2340 generates a suction that pulls any dust particles remaining within the hood 2320 into a collection area for disposal.

Figure 31A:
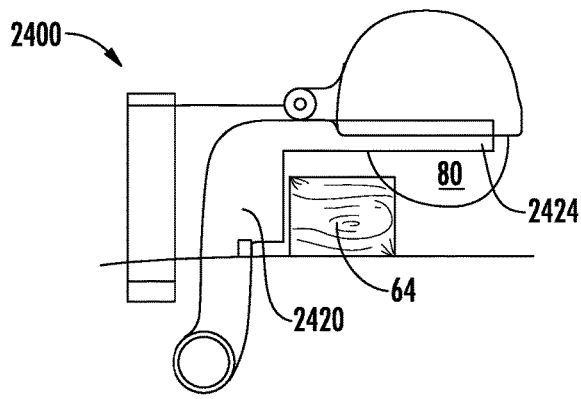
FIG. 31A is a side schematic view of a dust control system for a circular saw.
Figure 31B:
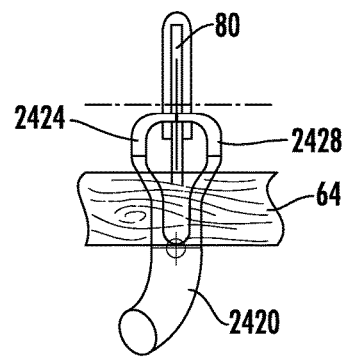
FIG. 31B is a top schematic view of the dust control system of FIG. 31A.

FIGS. 31A and 31B depict a dust collection system 2400 for a circular saw. The dust collection system 2400 includes a dust chute 2420 positioned behind the workpiece 64 and two dust collection arms 2424 and 2428 that extend around the saw blade 80 to retain dust particles within the area of the dust chute 2420. In some embodiments, the dust chute is connected to a vacuum source to generate a suction that pulls dust and debris particles into the dust chute for disposal.

Figure 32:
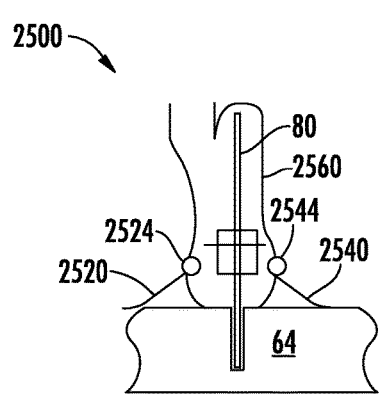
FIG. 32 is a front schematic view of a dust control system for a circular saw.

FIG. 32 illustrates a dust collection system 2500 for a circular saw. The dust collection system 2500 includes two covers 2520 and 2540, each connected to a saw guard 2560 by a hinge 2524 and 2544, respectively. The covers 2520 and 2540 prevent dust and debris particles from being directed out the sides of the circular saw blade 80 as the saw blade 80 cuts workpiece 64. The hinges 2524 and 2544 enable the covers 2520 and 2540 to move as the saw blade 80 is moved to cut the workpiece 64 such that the covers 2520 and 2540 do not interfere with the workpiece 64 or the blade 80 during the cutting operation.

Figure 33:
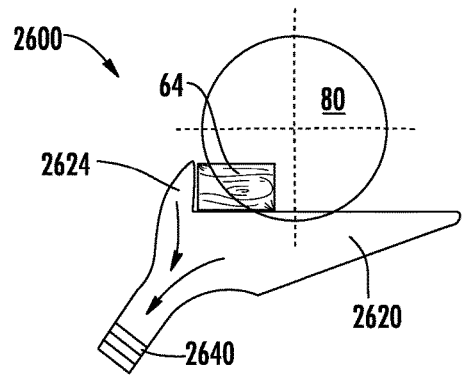
FIG. 33 is a side schematic view of a dust control system for a circular saw.

FIG. 33 illustrates a dust collection system 2600 for a circular saw. The dust collection system 2600 includes a lower collector 2620, a rear collector 2624, and a suction tube 2640. The lower collector 2620 is positioned beneath the saw blade 80 and workpiece 64 to collect dust and debris ejected downwardly by the cutting operation. The rear collector 2624 is positioned behind the workpiece to collect dust and debris ejected behind the workpiece. The suction tube 2640 is connected to a vacuum source to generate a negative air pressure in the suction tube 2640 that pulls the dust and debris collected in the lower and rear collectors 2620 and 2624 through the suction tube 2640 and to a collection area for storage and disposal.

Figure 34:
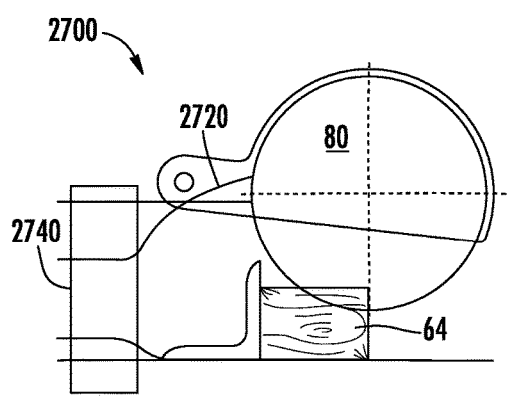
FIG. 34 is a side schematic view of a dust control system for a circular saw.

FIG. 34 illustrates a dust collection system 2700 for a circular saw. The dust collection system 2700 includes a fixed hood 2720 and a collection tube 2740. The fixed hood extends behind and above the workpiece 64 to prevent egress of dust and debris ejected as the saw blade 80 cuts the workpiece. The fixed hood 2720 directs the dust and debris into the collection tube 2740 which, in some embodiments, is connected to a vacuum source to pull the dust and debris away from the circular saw.

Figure 35:
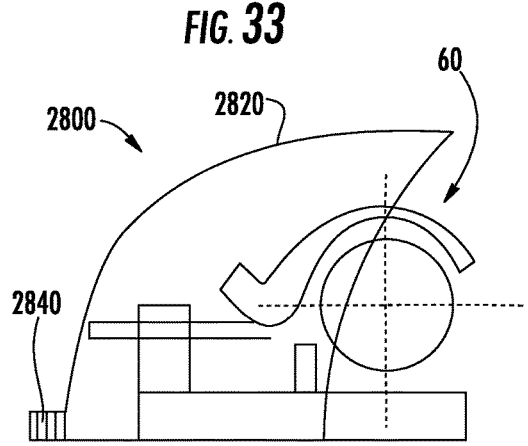
FIG. 35 is a side schematic view of a dust control system for a circular saw.

FIG. 35 depicts a dust collection system 2800 for a miter saw 60. The dust collection system 2800 includes a hood 2820 and a collection tube 2840. The hood 2820 is configured with elastic members that enable the hood to expand open for use and be collapsed when the hood 2820 is not in use, for example in the manner of a quick-open tent. The hood 2820 blocks dust and debris particles from exiting the area behind the miter saw 60, and the collection tube 2840 collects the dust and debris from within the hood 2820. In some embodiments, the collection tube is connected to a vacuum source to pull the dust and debris away from the circular saw.

Figure 36:
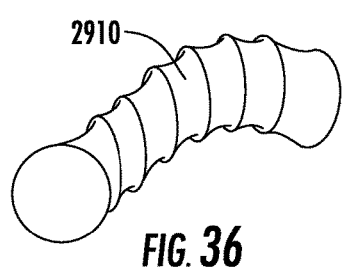
FIG. 36 is a side schematic view of a suction hose for use with a dust control system of a circular saw.

FIG. 36 depicts a suction hose 2910 for use in a dust collection system of a circular saw. The hose 2910 is a fixed length hose that is formed of a pliable material to enable the hose 2910 to bend to a desired position.

Figure 37:
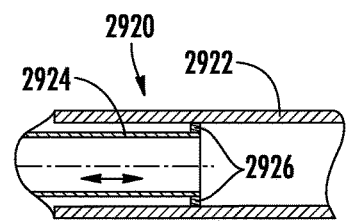
FIG. 37 is a cross-sectional schematic view of a telescoping suction hose for use with a dust control system of a circular saw.

FIG. 37 illustrates another suction hose 2920 for use in a dust collection system of a circular saw. The suction hose 2920 includes an outer tube 2922 and an inner tube 2924. The inner tube 2924 is configured to telescope into the outer tube 2922 to vary the length of the suction hose 2920. Sealing elements 2926 prevent leakage of air and dust from the suction hose at the junction of the outer and inner tubes 2922 and 2924.

Figure 38:
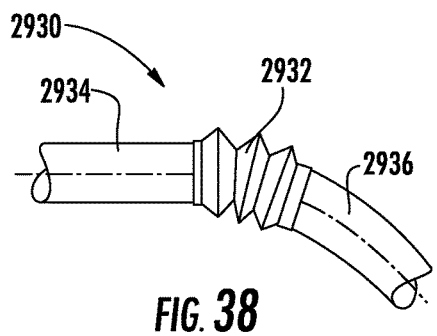
FIG. 38 is a side schematic view of a suction hose having a rubber gaiter.

FIG. 38 illustrates another suction hose 2930 having a rubber gaiter 2932. The rubber gaiter 2932 is interposed between two hose portions 2934 and 2936 and enables the suction hose 2930 to bend and contract at the rubber gaiter 2932 to position the suction hose 2930 at a variety of angles and positions.

Figure 39:
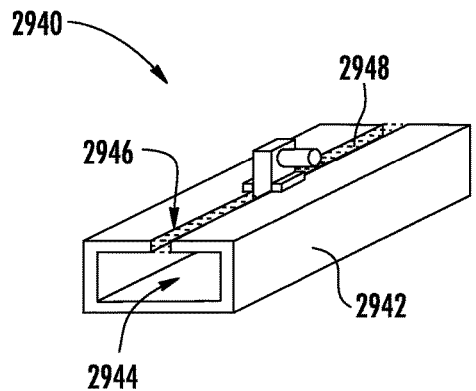
FIG. 39 is a perspective schematic view of a canal covered with brushes.

FIG. 39 illustrates a dust transport 2940 having a rigid hollow tube 2942, which defines a transport channel 2944 and an upper opening 2946, and a plurality of brushes 2948 positioned in the upper opening 2946. Dust and debris flows through the transport channel 2944, while the brushes 2948 prevent the dust and debris from exiting the channel 2944 through the upper opening 2946.

Figure 40:
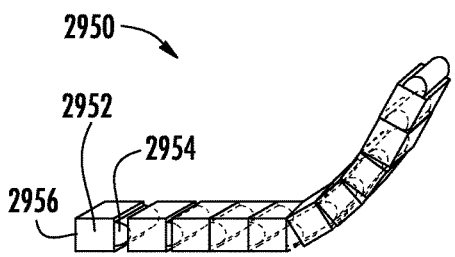
FIG. 40 is a perspective schematic view of a drag chain dust transport for use with a dust control system of a circular saw.

FIG. 40 illustrates another dust transport 2950 having a plurality of links 2952 attached to one another. The links 2952 are hollow and each link 2952 includes a curved end 2954 and a flat end 2956. The flat end 2956 is configured to pivotably support the curved end 2954 of the adjacent link 2952, enabling each link 2952 in the chain to pivot with respect to the neighboring links 2952. A channel for dust and debris transport is formed through the center of the chain of connected links 2952.

Figure 41:
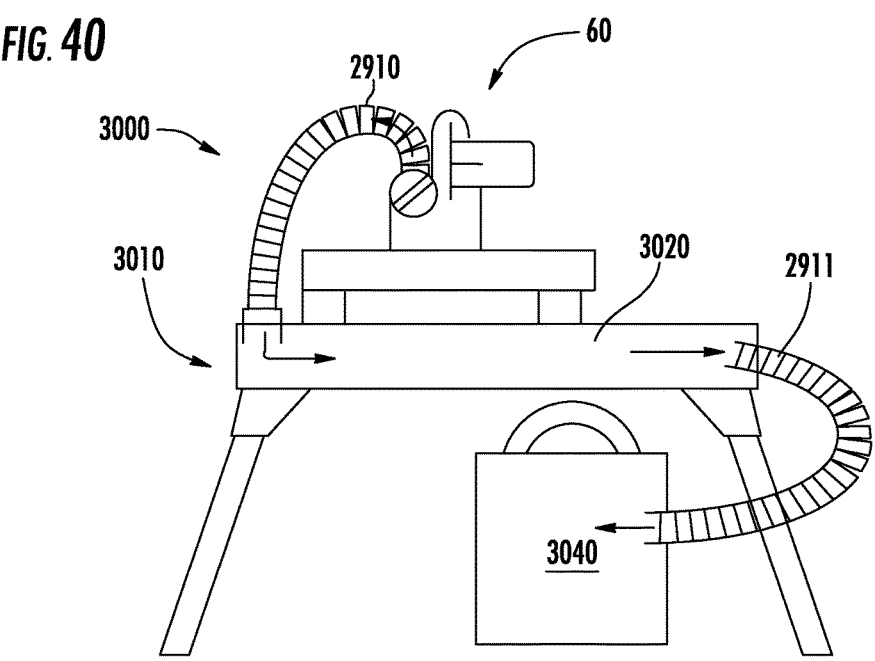
FIG. 41 is a side schematic view of a saw having a stand with a channel.

FIG. 41 depicts a miter saw 60 having a stand 3010 with a hollow channel 3020. The hollow channel 3020 is connected at one end to a suction hose 2910 that connects to a dust collection system of the miter saw 60. The hollow channel 3020 is connected at the other end to another suction hose 2911, which is substantially identical to suction hose 2910, to connect the channel 3020 to a collection area 3040. Dust and debris collected by the dust collection system of the miter saw 60 is transported through the suction hose 2910, to the hollow channel 3020, through the second suction hose 2911, and into the collection area 3040.

Figure 42:
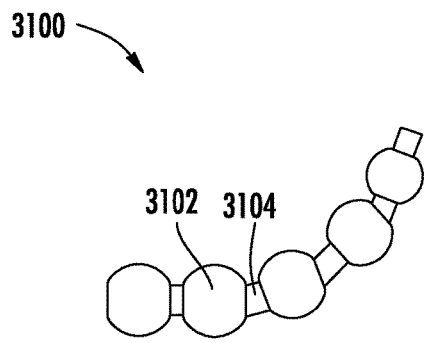
FIG. 42 is a schematic view of a bowl chain dust transport for use with a dust control system of a circular saw.

FIG. 42 depicts a suction channel 3100 formed of a plurality of bowls 3102. The bowls 3012 are attached to one another by a flexible connector 3104 to form a flexible chain. Dust and debris flows through the hollow center of the bowls 3102 and connectors 3104.

Figures 43A, 43B:
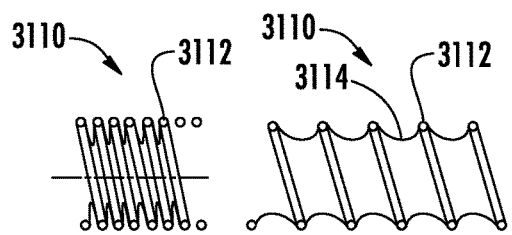
FIG. 43A is a cross-sectional schematic view of a self-contracting suction hose for use with a dust control system of a circular saw in a contracted state.
FIG. 43B is a cross-sectional schematic view of the self-contracting suction hose of FIG. 43A in an expanded state

FIGS. 43A and 43B depict a self-contracting suction hose 3110. The self-contracting suction hose 3110 includes a spring 3112 connected by an airtight flexible membrane 3114. The spring 3112 contracts the hose 3110 to the position of FIG. 43A in the absence of external forces, collapsing the flexible membrane 3114 within the spring 3112. The spring is configured to expand the hose 3110 to the position of FIG. 43B as the ends of the hose 3110 are pulled apart. Dust and debris flows through the center of the spring 3112 and membrane 3114.

Figure 44:
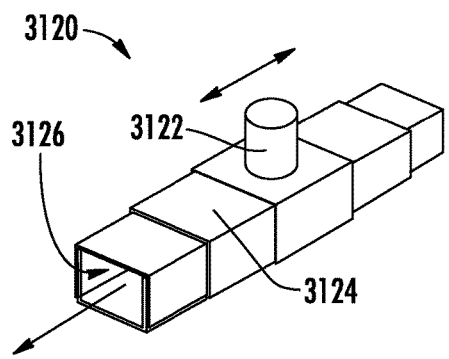
FIG. 44 is a perspective schematic view of a telescoping canal for use with a dust control system of a circular saw.

FIG. 44 illustrates a telescoping dust transport 3120. The telescoping dust transport 3120 includes a plurality of telescoping channels 3124 that telescope within one another to enable expansion and contraction of the dust transport 3120. The transport 3120 also includes a hose connector 3122 for connecting the transport 3120 to a hose, for example of a dust collection system. Dust and debris travels through the center of the telescoping channels 3124. In one embodiment, the telescoping channels are formed by two pieces of C-channel facing opposite directions.

FIGS. 45-54 illustrate various dust separation apparatus for use in a dust collection system.

Figure 45:
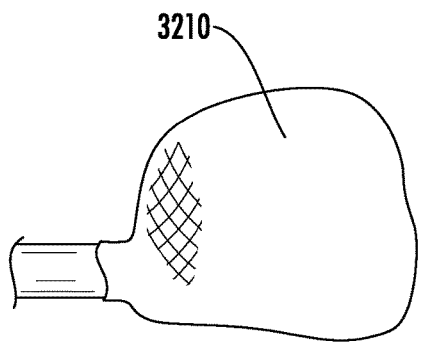
FIG. 45 is a side schematic view of a textile bag for use in a dust control system of a circular saw.

FIG. 45 shows a textile dust bag 3210 that collects dust and debris within the dust bag 3120.

Figure 46:
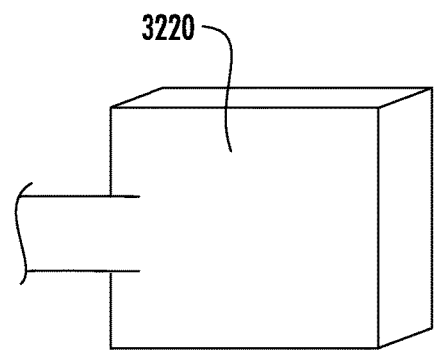
FIG. 46 is a side schematic view of a paper bag for use in a dust control system of a circular saw.

FIG. 46 illustrates a paper bag 3220 that collects dust and debris from a dust collection system. In some embodiments, the bag is made of fleece or another suitable material.

Figure 47:
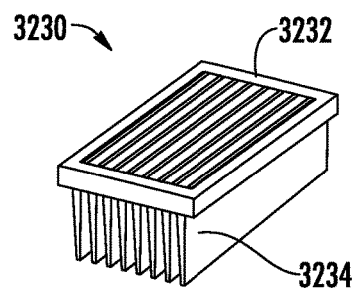
FIG. 47 is a perspective schematic view of a filter cartridge for use in a dust control system of a circular saw.

FIG. 47 illustrates a filter cartridge 3230 including a support member 3232 and a filter portion 3234. The support member 3232 retains the filter cartridge 3230 in a definite shape, while the filter portion 3234 includes a filter material that filters dust and debris out of air as the air moves through the filter portion 3234.

Figure 48:
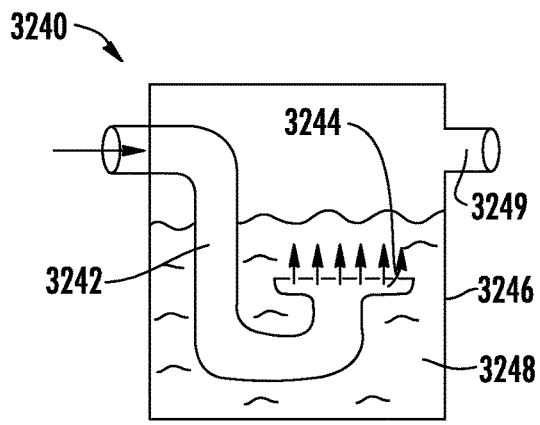
FIG. 48 is a side schematic view of a water separation system for use in a dust control system of a circular saw.

FIG. 48 shows a water separation apparatus 3240 for a dust collection system. The water separation apparatus includes an air pipe 3242 through which dust and air from a dust collection system flows, and a water tank 3246. The air pipe 3242 has an outlet 3244 that is submerged in water 3248 in the water tank 3246. Air having dust and debris flows through the air pipe 3242 and out the outlet 3246. Dust and debris remains in the water 3248, while air passes rises out of the water and passes through outlet 3249. The water 3248 having dust and debris is then disposed of.

Figure 49:
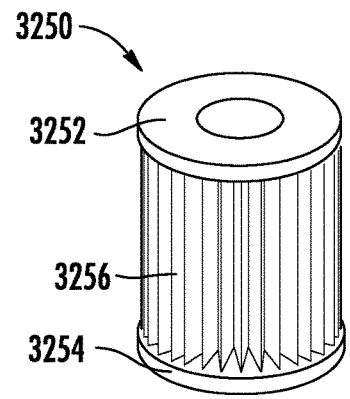
FIG. 49 is a perspective schematic view of a filter cartridge for use in a dust control system of a circular saw.

FIG. 49 depicts another filter cartridge 3250 for a dust collection system. The filter cartridge 3250 includes an upper annular support 3252, a lower annular support 3254, and a filter portion 3256 interposed between the upper and lower annular supports 3252 and 3254. Air having dust and debris flows through the filter cartridge 3250, and the filter portion 3256 removes the dust and debris from the air for subsequent disposal.

Figure 50:
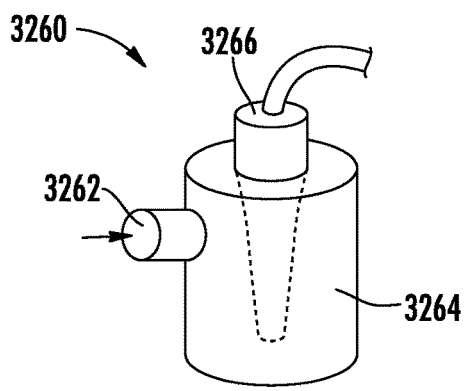
FIG. 50 is a perspective schematic view of a cyclone separator for use in a dust control system of a circular saw.

FIG. 50 illustrates a cyclone dust separation apparatus 3260 for a dust collection system. The cyclone apparatus 3260 includes an inlet 3262, a cylindrical chamber 3264, and an outlet 3266. Air having dust and debris enters the chamber through the inlet 3262. The inlet 3262 is offset from the center of the cylindrical chamber 3264 such that the air enters the chamber 3264 with an angular velocity and forms a cyclone within the chamber 3264. Dust and debris moves to the outside of the chamber due to centripetal forces, eventually settling on the bottom of the chamber 3264, while clean air flows from the outlet 3266.

Figure 51:
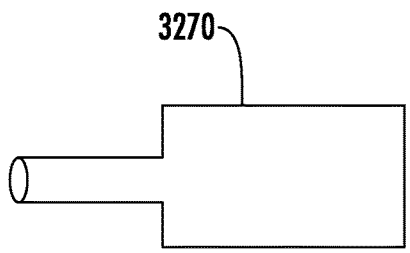
FIG. 51 is a side schematic view of a membrane filter for use in a dust control system of a circular saw.

FIG. 51 depicts a membrane filter 3270 for a dust collection system. The membrane filter 3270 is formed of a material having small pores that allow air to pass through, but disable dust and debris from passing through the membrane. Dust and debris is collected within the membrane filter 3270 for subsequent disposal.

Figure 52:
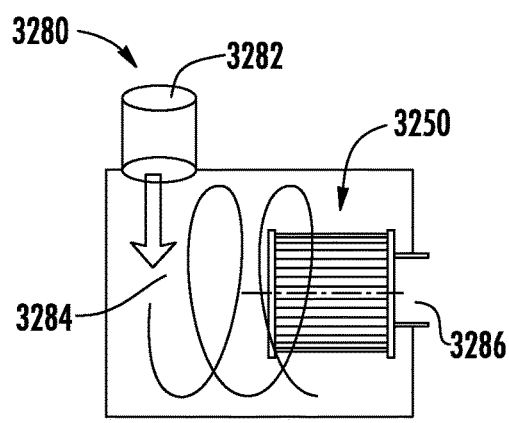
FIG. 52 is a cross-sectional schematic view of a cyclone and filter separation system for use in a dust control system of a circular saw.

FIG. 52 illustrates a cyclone dust separation apparatus 3280 having a filter cartridge 3250 substantially identical to the filter cartridge described with reference to FIG. 49. The cyclone apparatus 3280 includes an inlet 3282, a cylindrical chamber 3284, and an outlet 3286. Air having dust and debris enters the chamber through the inlet 3282. The inlet 3282 is offset from the center of the cylindrical chamber 3284 such that the air flowing into the chamber 3284 forms a cyclone within the chamber. Dust and debris moves to the outside of the chamber due to centripetal force, eventually settling on the bottom of the chamber 3284, while clean air flows from the outlet 3286. The filter cartridge 3250 prevents any residual dust from flowing through the outlet 3286, ensuring that the outflow is clean air and the dust and debris is collected in the chamber 3284.

Figure 53:
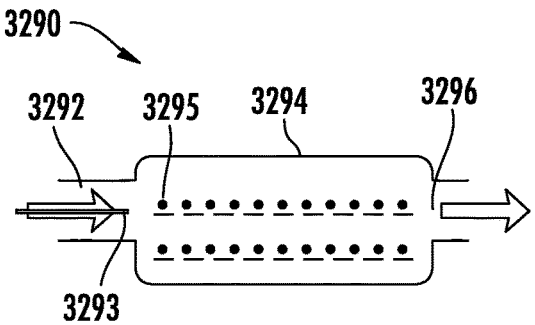
FIG. 53 is a cross-sectional schematic view of an electrostatic filter for use in a dust control system of a circular saw.

FIG. 53 illustrates an electrostatic dust filter 3290. The electrostatic filter 3290 has an inlet 3292 with an anode 3293, which imparts a positive charge on dust particles as the dust particles pass into a filter chamber 3294. The filter chamber 3294 includes a plurality of negatively charged members 3295 that attract the positively charged dust particles. Clean air then passes through the outlet 3296, while the dust collected in the filter 3290 is subsequently disposed.

Figure 54:
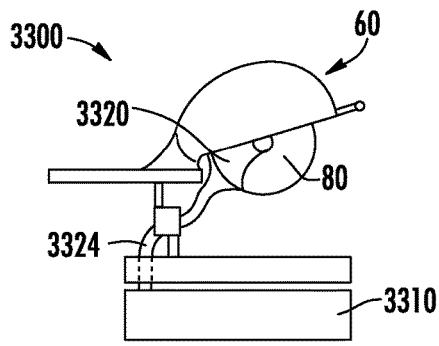
FIG. 54 is a side schematic view of a miter saw having a dust collection system.

FIG. 54 depicts a dust collection system 3300 for a miter saw 60. The dust collection system 3300 includes a dust chute 3320 positioned proximate to the saw blade 80 and a suction hose 3324 connecting the dust chute 3320 to an exhauster 3310. The exhauster 3310 is positioned immediately beneath the miter saw 60 and is mounted to a lower surface of the miter saw 60.

Figure 55:
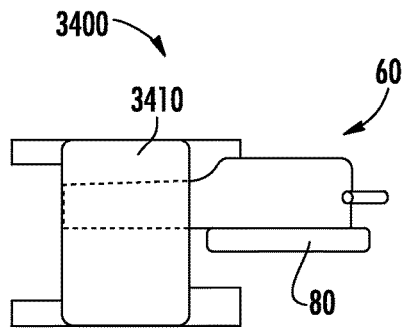
FIG. 55 is a top schematic view of a miter saw having a dust collection system.

FIG. 55 illustrates another dust collection system 3400 for a miter saw 60. The dust collection system 3400 includes an exhauster 3410 positioned above the circular saw 60. The exhauster 3410 is configured to slide with the miter saw 60 as the user moves the miter saw 60.

Figure 56:
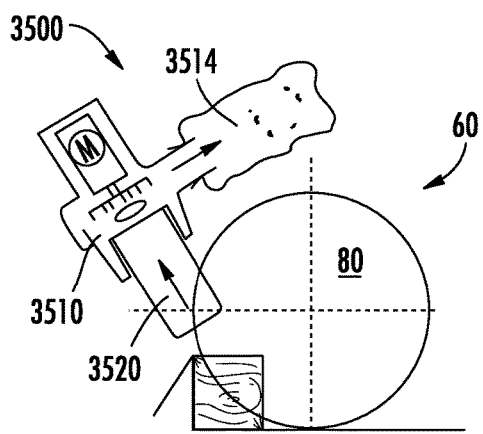
FIG. 56 is a side schematic view of a miter saw having a dust collection system.

FIG. 56 illustrates a dust collection system 3500 for a miter saw 60. The dust collection system 3500 includes a dust chute 3520 positioned proximate to the blade 80 of the saw 60 to collect dust from a cutting operation. The dust chute 3520 is connected to an exhauster 3510, which moves the air from the dust chute 3520 to a collection bag 3514.

Figure 57:
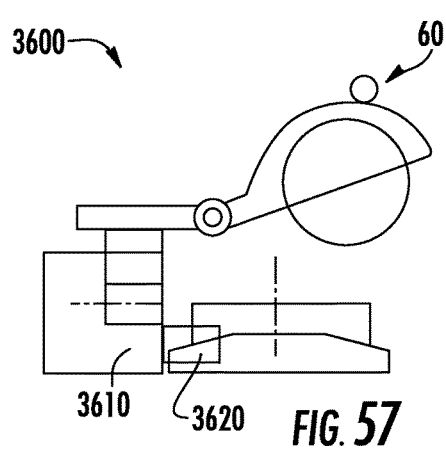
FIG. 57 is a side schematic view of a miter saw having a dust collection system.

FIG. 57 illustrates another dust collection system 3600 for a miter saw 60. The dust collection system 3600 includes an exhauster 3610 and a dust collection tube 3620. The dust collection tube 3620 is positioned behind and beneath the saw 60, while the exhauster 3610 is positioned behind the collection tube and is configured to receive dust and debris from the saw 60 through the tube 3620.

Figure 58:
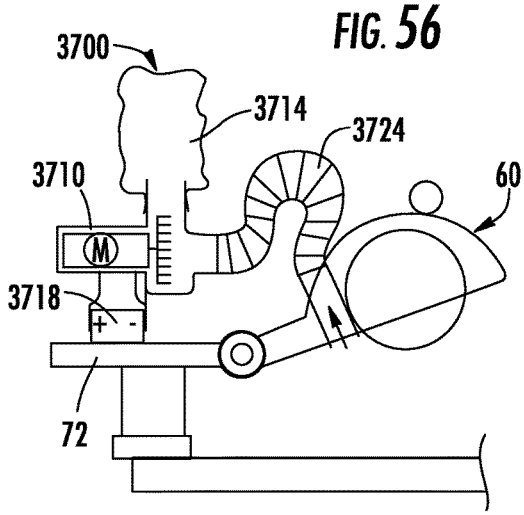
FIG. 58 is a side schematic view of a miter saw having a dust collection system.

FIG. 58 depicts a dust collection system 3700 for a miter saw 60. The dust collection system includes an exhauster 3710, a collection bag 3714, and a flexible suction hose 3724. The exhauster 3710 is mounted on the saw slide 72 of the miter saw 60 by a magnet 3718 affixed to the exhauster 3710. The collection bag 3714 is positioned on the exhauster 3710 to receive air, dust, and debris forced from the suction hose 3724 through the exhauster 3710.

Figure 59:
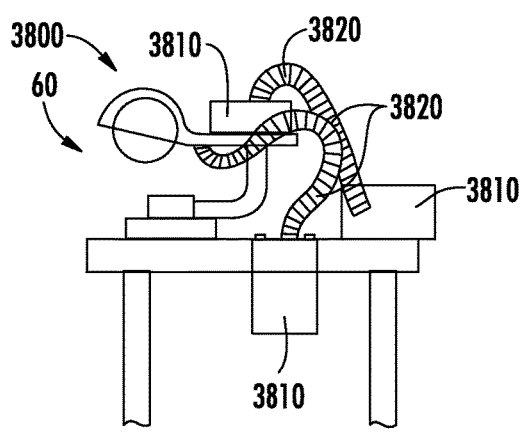
FIG. 59 is a side schematic view of a miter saw having a dust collection system.

FIG. 59 illustrates another dust collection system 3800 for a miter saw 60. The dust collection system 3800 includes an exhauster 3810 connected to a dust collector (not shown) of the miter saw 60 by a flexible suction hose 3820. The exhauster 3810 is not affixed to a structure, and the flexible suction hose 3820 enables the exhauster 3810 to be positioned in a desired position by the user. Several possible positions for placing the exhauster 3810 are shown in FIG. 59.

Figure 60:
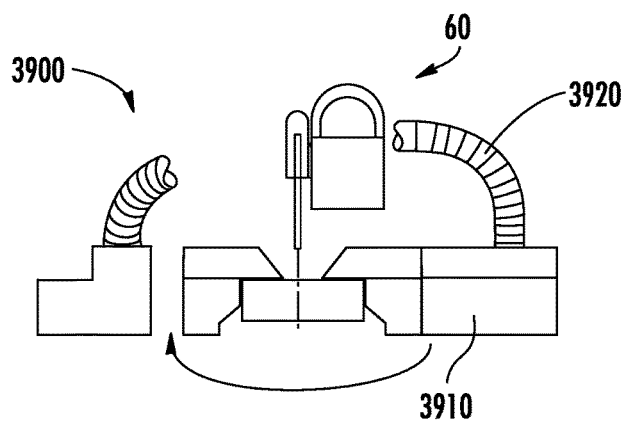
FIG. 60 is a front schematic view of a miter saw having a dust collection system.

FIG. 60 illustrates yet another dust collection system 3900 for a miter saw 60. The dust collection system 3900 includes an exhauster 3910 and a suction hose 3920 that connects to a dust collector (not shown) of the miter saw 60. The exhauster 3910 is positioned within a table on which the miter saw 60 is supported. In some embodiments, the exhauster is integral with a base of the miter saw.

Figure 61:
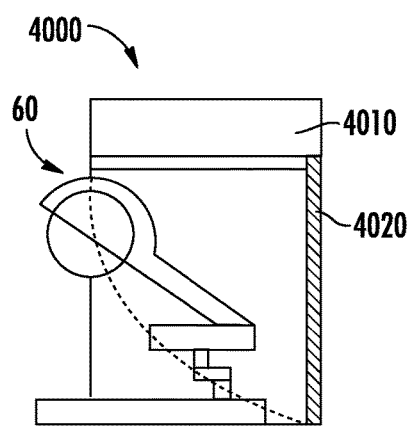
FIG. 61 is a side schematic view of a miter saw having a dust collection system.

FIG. 61 illustrates a dust collection system 4000 for a miter saw 60. The dust collection system 4000 includes an exhauster 4010 and a dust collection hood 4020. The dust collection hood 4020 collects dust and debris from about the miter saw 60. The exhauster 4010 is mounted to the top of the dust collection hood 4020 and is configured to receive dust and debris collected by the dust collection hood 4020.

Figure 62:
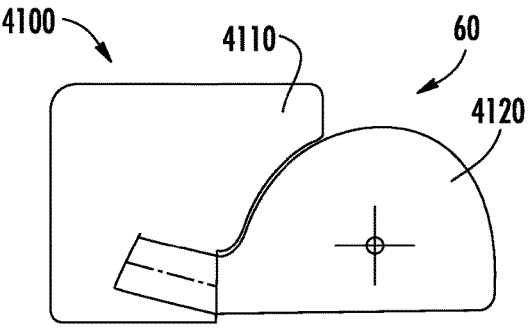
FIG. 62 is a side schematic view of a miter saw having a dust collection system.

FIG. 62 illustrates a dust collection system 4100 for a miter saw 60. The dust collection system 4100 includes an exhauster 4110 and a saw guard 4120. The exhauster 4110 is mounted to the saw guard 4120 and is configured to receive dust and debris expelled during a cutting operation of the miter saw 60.

Figure 63:
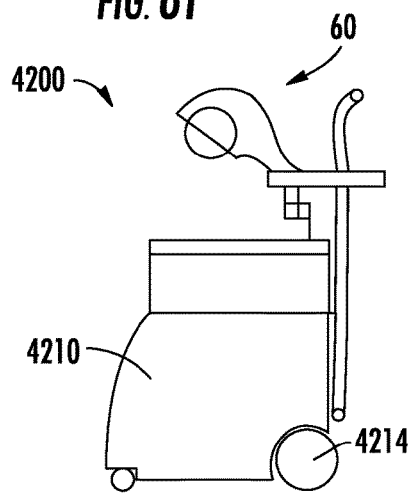
FIG. 63 is a side schematic view of a miter saw having a dust collection system.

FIG. 63 shows another dust collection system 4200 for a miter saw 60. The dust collection system 4200 includes an exhauster 4210 having wheels 4214 to enable mobility of the dust collection system 4200. The miter saw 60 is mounted on top of the exhauster 4210 to enable simple combined transport of the dust collection system 4200 and the miter saw 60.

Figure 64:
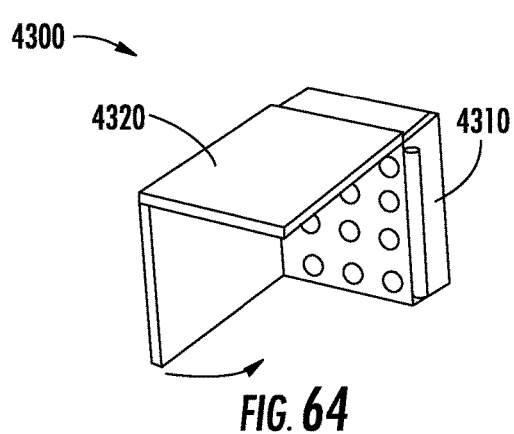
FIG. 64 is a perspective schematic view of a dust collection system for a circular saw.

FIG. 64 illustrates yet another dust collection system 4300 for a miter saw. The dust collection system 4300 includes a dust collection hood 4320 and an exhauster 4310. The dust collection hood 4320 is configured to be positioned around a miter saw to prevent egress of dust and debris produced during a cutting operation. The exhauster 4310 is integrally mounted to the rear of the hood 4320 to receive the dust and debris trapped under the hood 4320.

It will be appreciated that variants of the above-described and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the disclosure.

What is claimed is:

1. A dust collection system for a circular saw having a saw housing and a motor configured to rotationally drive a saw blade, comprising:
    a dust collecting member including a body having a first end in which a dust collection opening is defined and a second end operably connectable to an airflow generation device; and
    a guide mechanism configured to support the dust collecting member on the saw housing such that the dust collection opening remains adjacent to an outer edge of the saw blade in response to the dust collecting member contacting the workpiece to move the dust collecting member,
    wherein the dust collecting member is configured to contact the workpiece as the saw blade moves translationally through a workpiece during a cutting operation to enable the dust collecting member to move past the workpiece and remain adjacent the outer edge of the saw blade, and
    wherein the guide mechanism further comprises:
        a cam follower pivotably connected to the dust collecting member at a pivot point; and
        a cam guide supported by the saw housing and configured to guide the cam follower along a predefined path such that, as the dust collecting member moves upon contact with the workpiece, the cam follower moves the dust collecting member and the dust collecting member pivots about the pivot point so that the dust collection opening remains proximate to an intersection between the outer edge of the saw blade and the workpiece.

2. The dust collection system of claim 1, wherein:

the cam guide has an arc shape centered about a center of the saw blade and defines a virtual pivot point at the center of the saw blade; and the cam follower is configured to move along the arc shaped cam guide about the virtual pivot point.

3. The dust collection system of claim 2, wherein:

the dust collecting member further comprises a pivot projection extending from the body and including a first end portion; and the dust collection system further comprises a pivot pin pivotably connecting the cam follower to the first end portion of the pivot projection at the pivot point.

4. The dust collection system of claim 3 further comprising:

a biasing member operably connected to a second end portion of the pivot projection and an end of the cam follower opposite the pivot pin, and configured to bias a second end portion of the pivot projection as the cam follower moves along the cam guide such that the first end of the dust collecting member pivots to remain proximate to the intersection between the outer edge of the saw blade and the workpiece.

5. The dust collection system of claim 4 further comprising:

a stop member fixed relative to the saw housing and configured to prevent the second end of the pivot projection from moving relative to the saw housing beyond a predetermined pivoting range.

6. The dust collection system of claim 1, wherein the dust collecting member further comprises:

an arcuate surface operably connected to a lower side of the body, the arcuate surface being configured to direct a reaction force produced by translationally moving the dust collecting member against the workpiece into an upward force to move the dust collecting member vertically over the workpiece to enable the dust collecting member to pass over the workpiece.

7. The dust collection system of claim 6, wherein the first end of the dust collecting member has a rounded contour.

8. The dust collection system of claim 1, wherein the second end of the body of the dust collecting member is coupled to a vacuum source.

9. A circular saw comprising:

a saw housing;

a saw blade rotatably coupled to the saw housing;

a motor supported in the saw housing and configured to rotationally drive the saw blade;

an airflow generation device supported by the saw housing;

a dust collecting member including a body having a first end in which a dust collection opening is defined and a second end operably connected to the airflow generation device; and a guide mechanism configured to support the dust collecting member on the saw housing such that the dust collection opening remains adjacent to an outer edge of the saw blade in response to the dust collecting member contacting the workpiece to move the dust collecting member, wherein the dust collecting member is configured to contact the workpiece as the saw blade moves translationally through a workpiece during a cutting operation to enable the dust collecting member to move past the workpiece and remain adjacent the outer edge of the saw blade, and wherein the guide mechanism further comprises:

a cam follower pivotably connected to the dust collecting member at a pivot point; and a cam guide supported by the saw housing and configured to guide the cam follower along a predefined path such that, as the dust collecting member moves upon contact with the workpiece, the cam follower moves the dust collecting member and the dust collecting member pivots about the pivot point so that the dust collection opening remains proximate to an intersection between the outer edge of the saw blade and the workpiece.

10. The circular saw of claim 9, wherein:

the cam guide has an arc shape centered about a center of the saw blade and defines a virtual pivot point at the center of the saw blade; and the cam follower is configured to move along the arc shaped cam guide about the virtual pivot point.

11. The circular saw of claim 10, wherein:

the dust collecting member further comprises a pivot projection extending from the body and including a first end portion; and the dust collection system further comprises a pivot pin pivotably connecting the cam follower to the first end portion of the pivot projection at the pivot point.

12. The circular saw of claim 11 further comprising:

a biasing member operably connected to a second end portion of the pivot projection and an end of the cam follower opposite the pivot pin, and configured to bias a second end portion of the pivot projection as the cam follower moves along the cam guide such that the first end of the dust collecting member pivots to remain proximate to the intersection between the outer edge of the saw blade and the workpiece.

13. The circular saw of claim 12 further comprising:

a stop member fixed relative to the saw housing and configured to prevent the second end of the pivot projection from moving relative to the saw housing beyond a predetermined pivoting range.

14. The circular saw of claim 9, wherein the dust collecting member further comprises:

an arcuate surface operably connected to a lower side of the body, the arcuate surface being configured to direct a reaction force produced by translationally moving the dust collecting member against the workpiece into an upward force to move the dust collecting member vertically over the workpiece to enable the dust collecting member to pass over the workpiece.

15. The circular saw of claim 14, wherein the first end of the dust collecting member has a rounded contour.

16. The circular saw of claim 9, wherein the airflow generation device is a vacuum source.

\* \* \* \* \*